Patented July 21, 1931

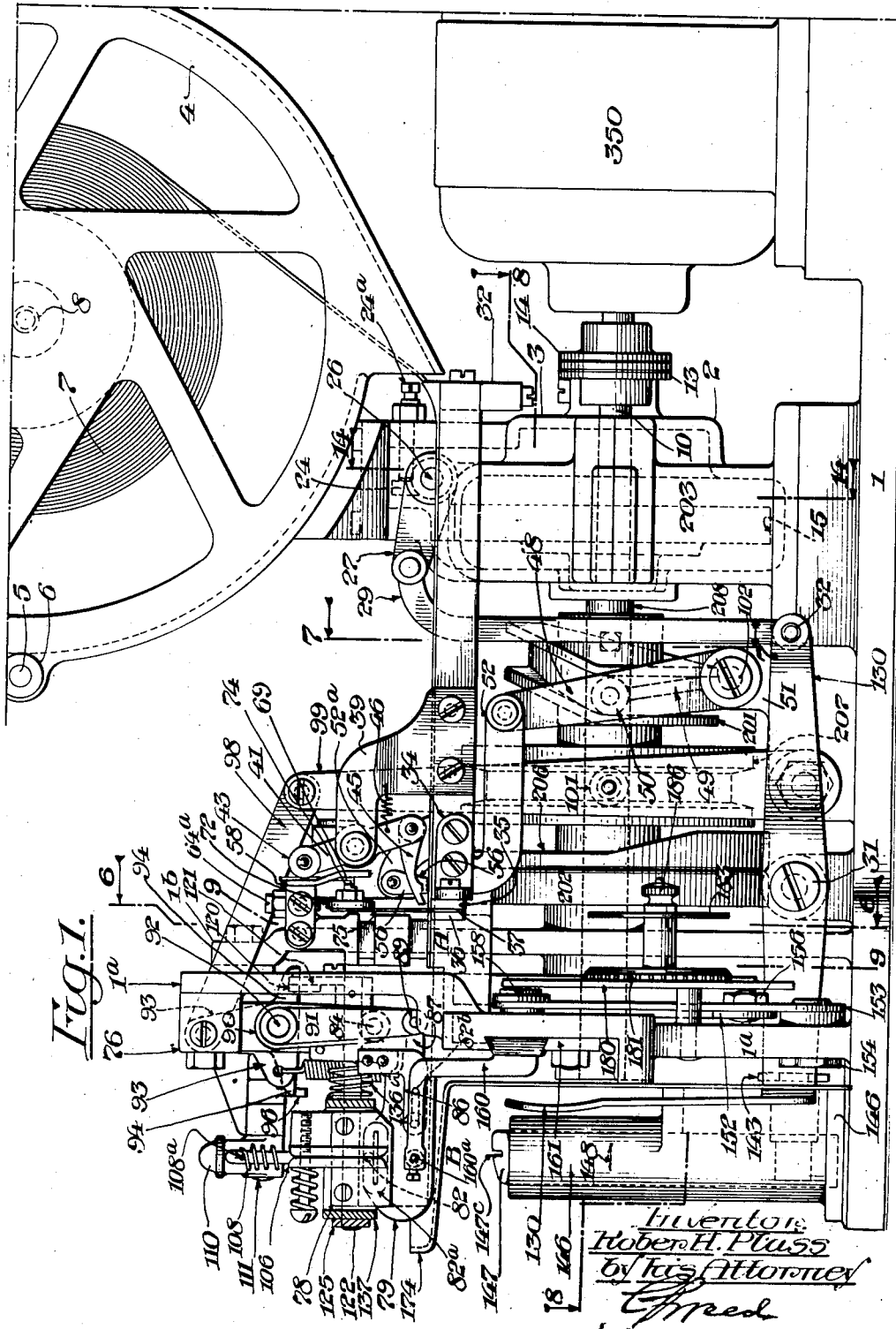

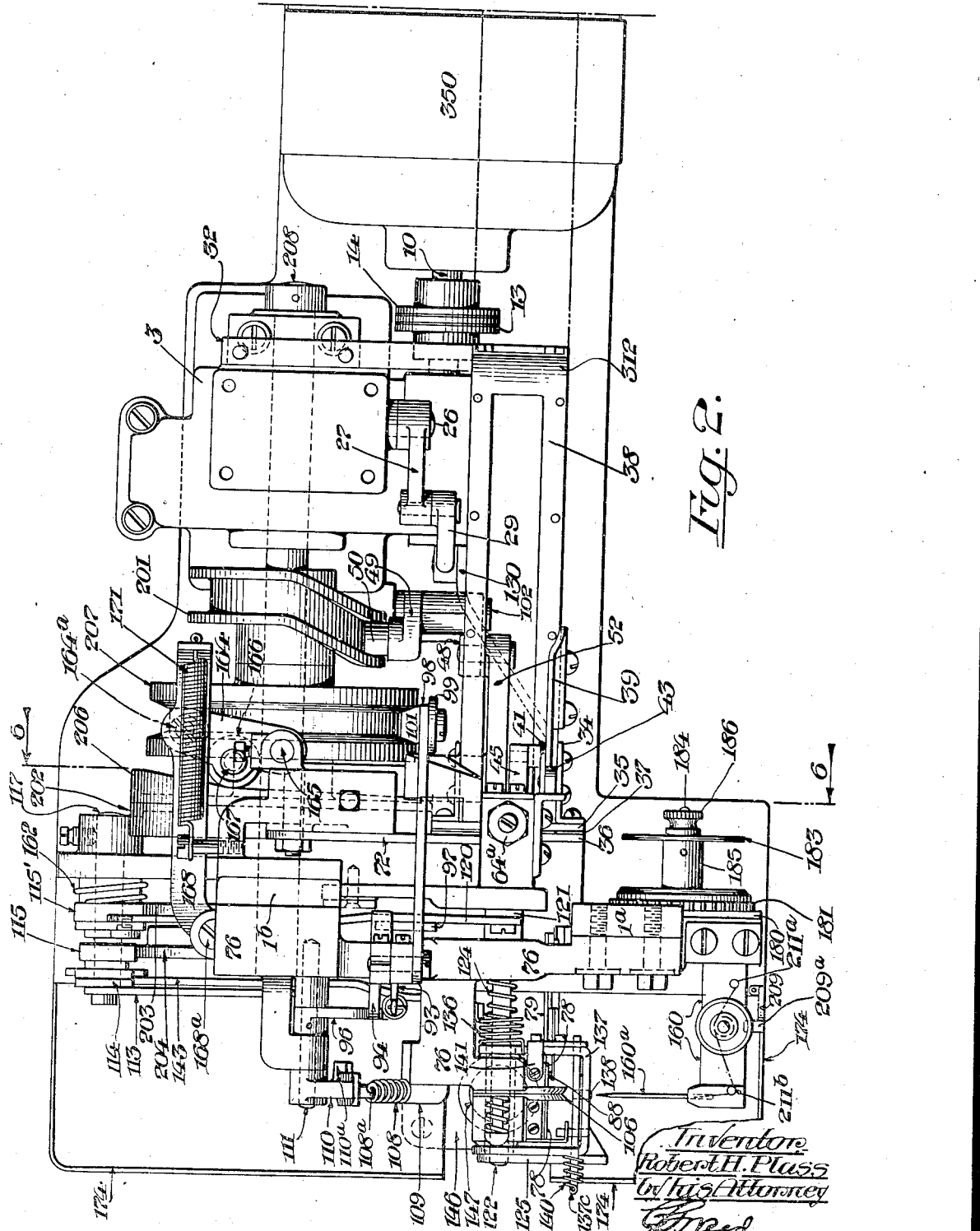

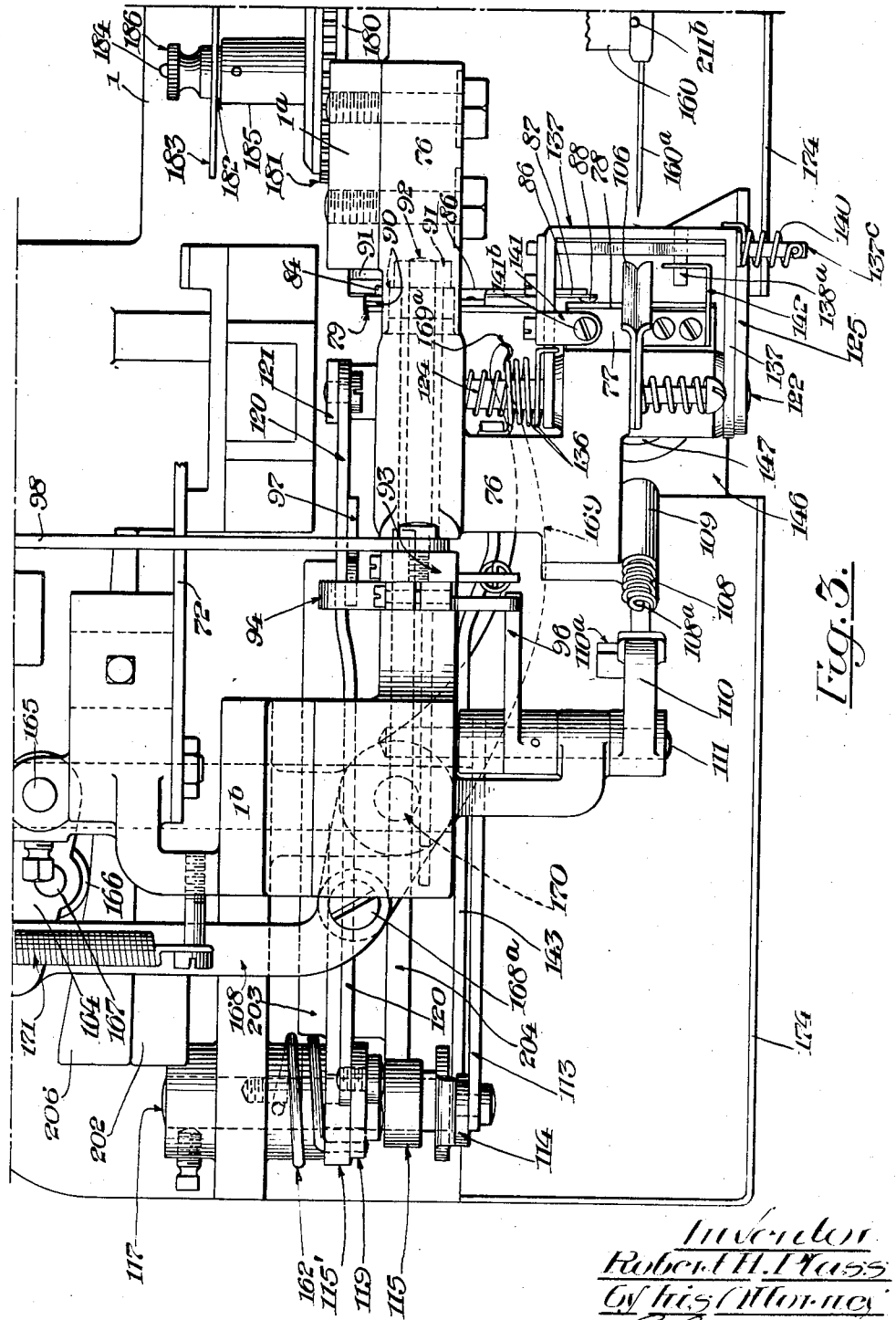

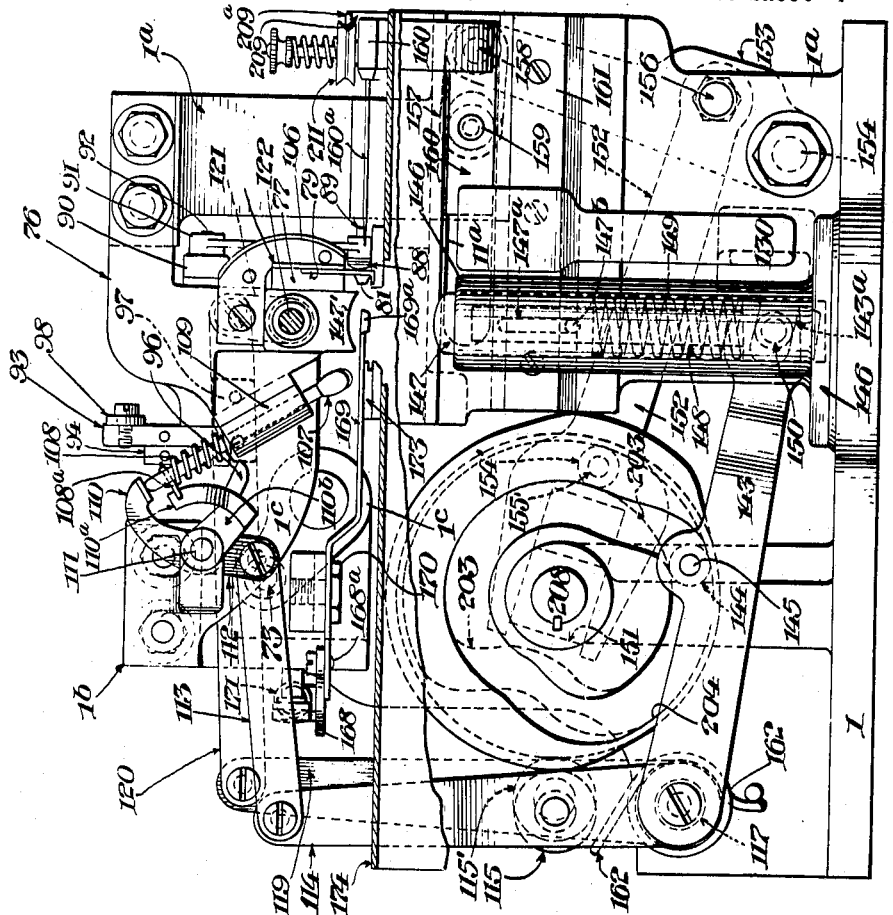
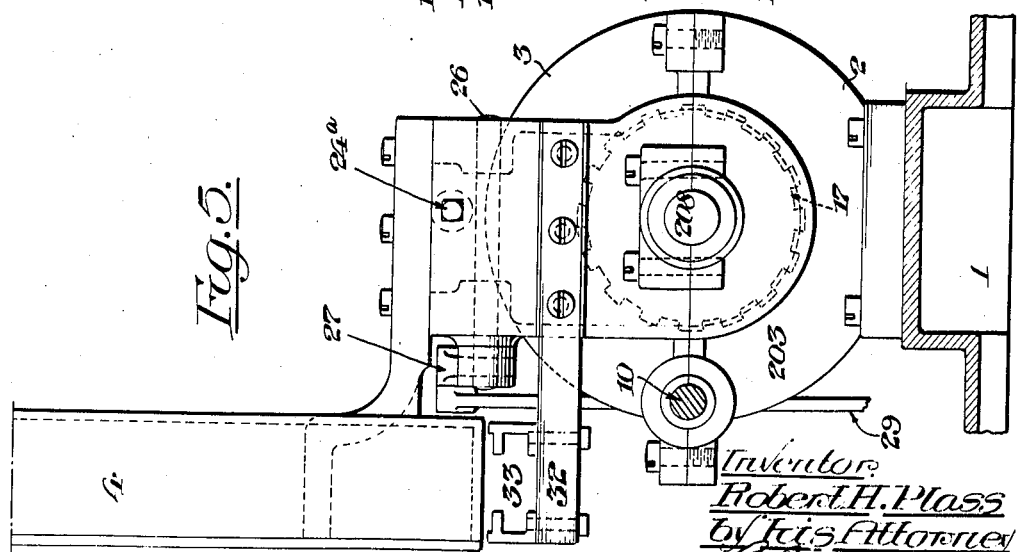

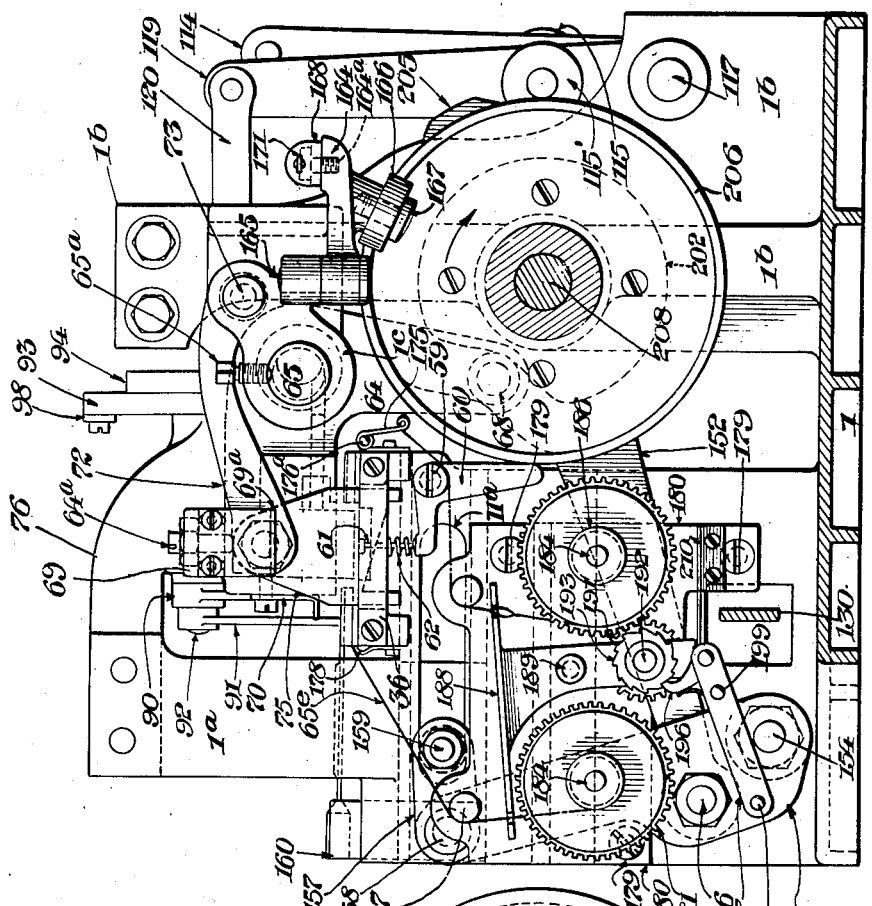

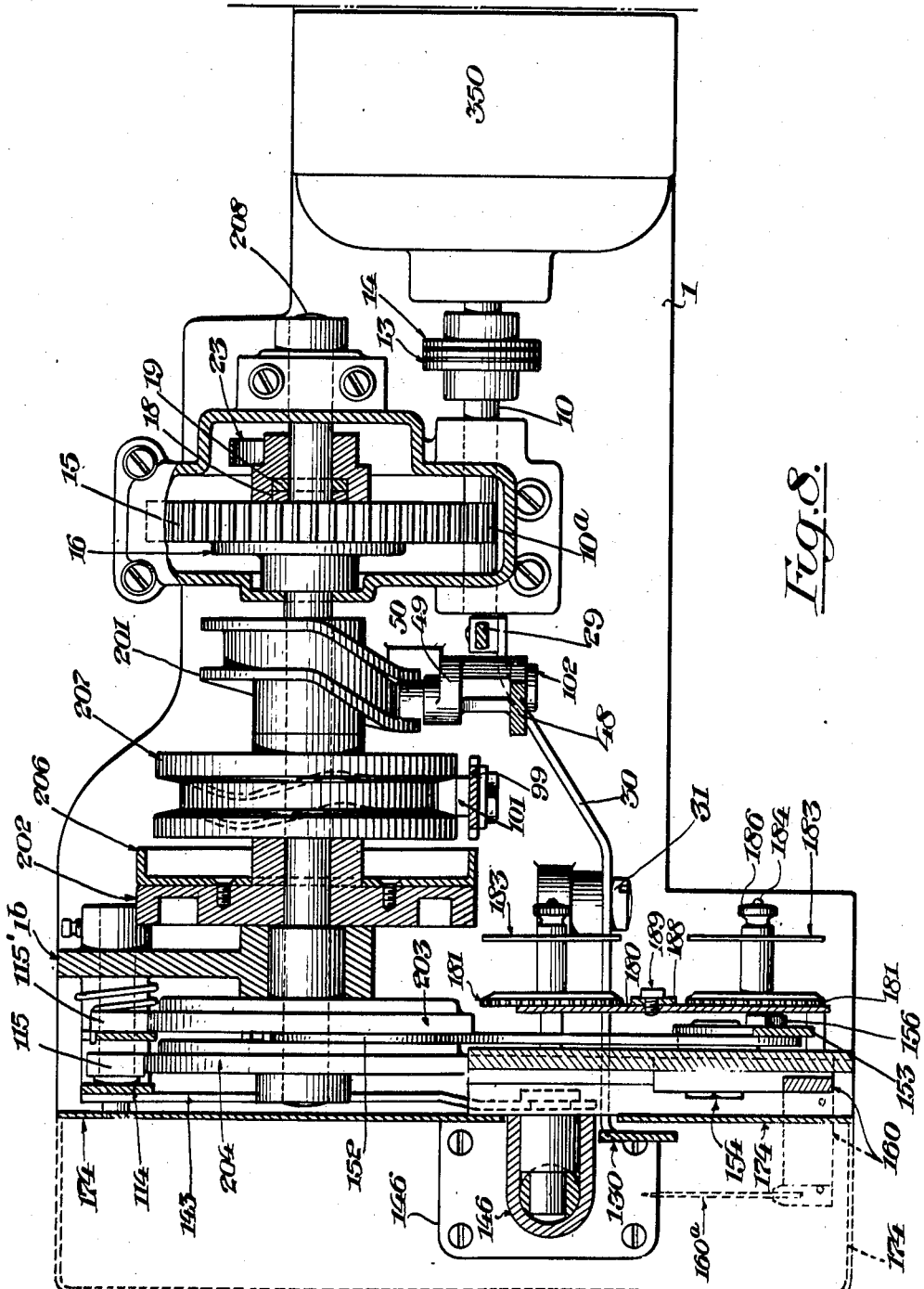

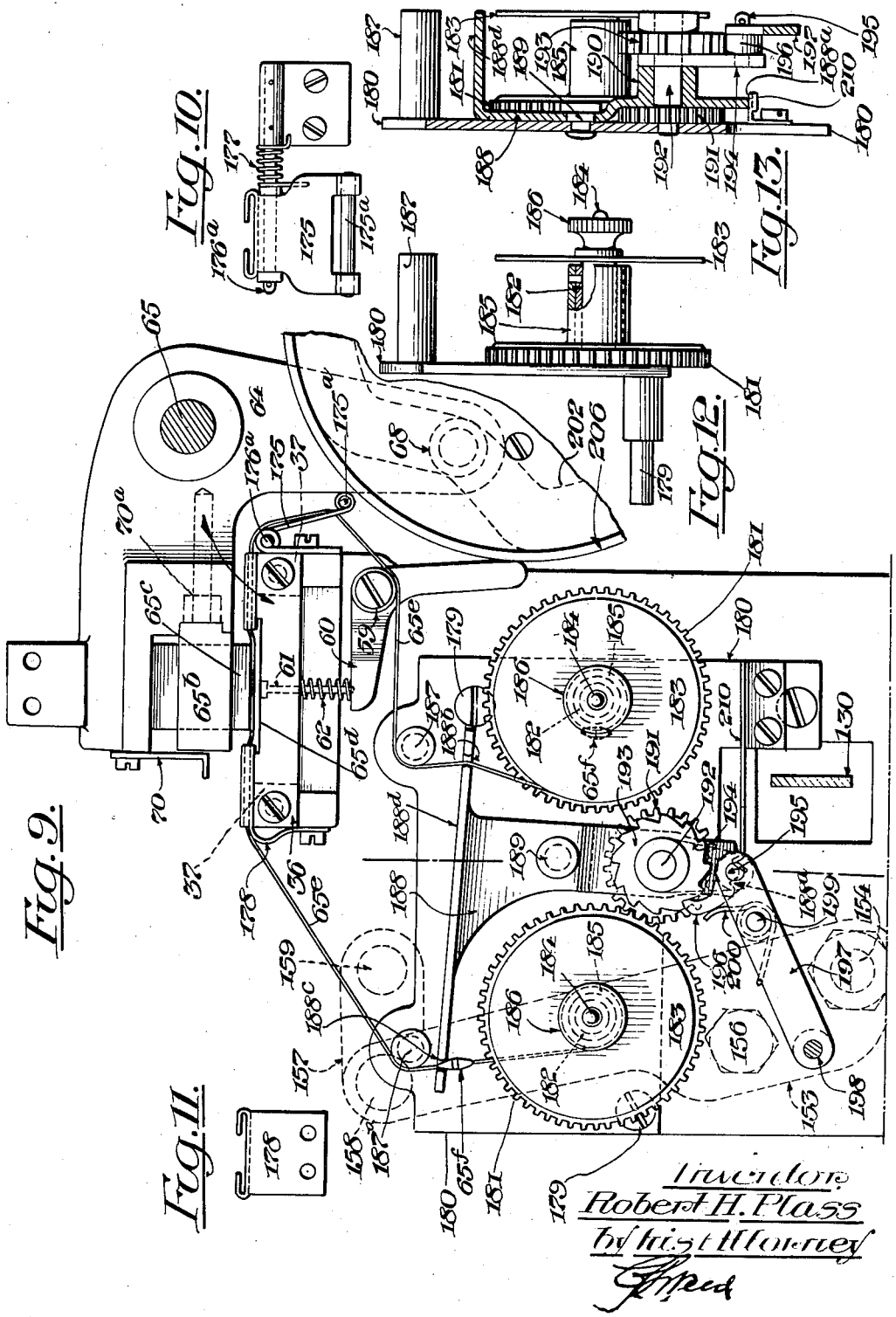

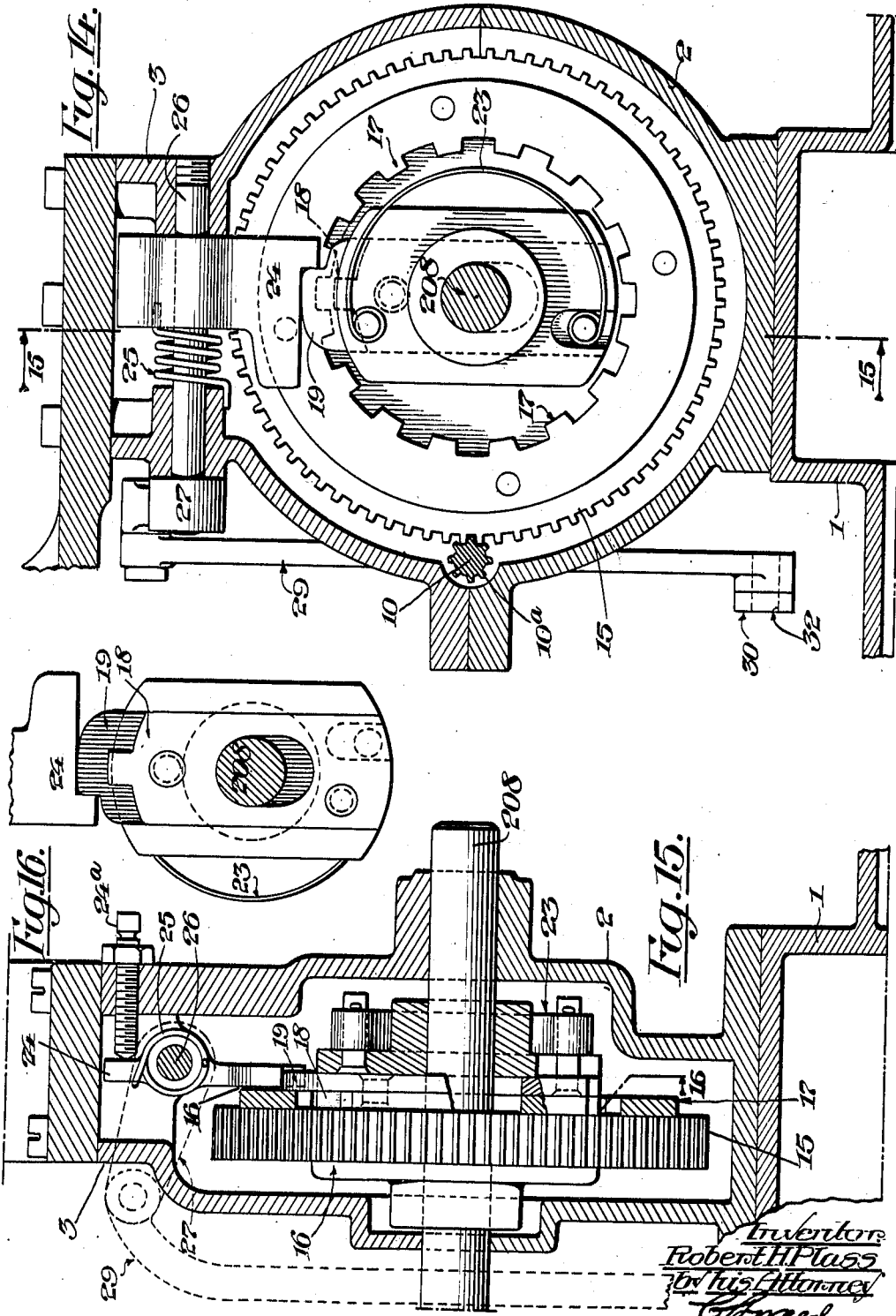

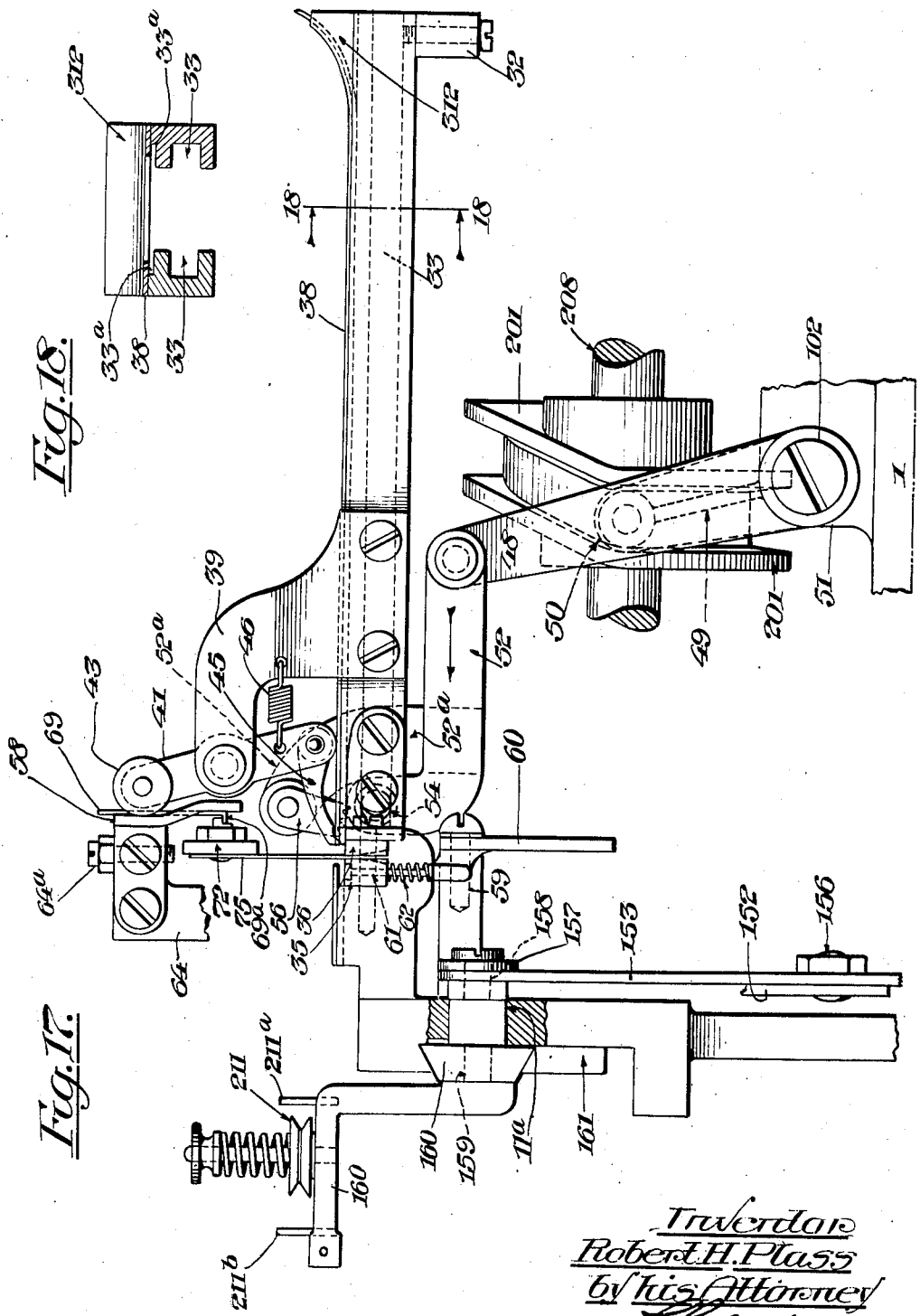

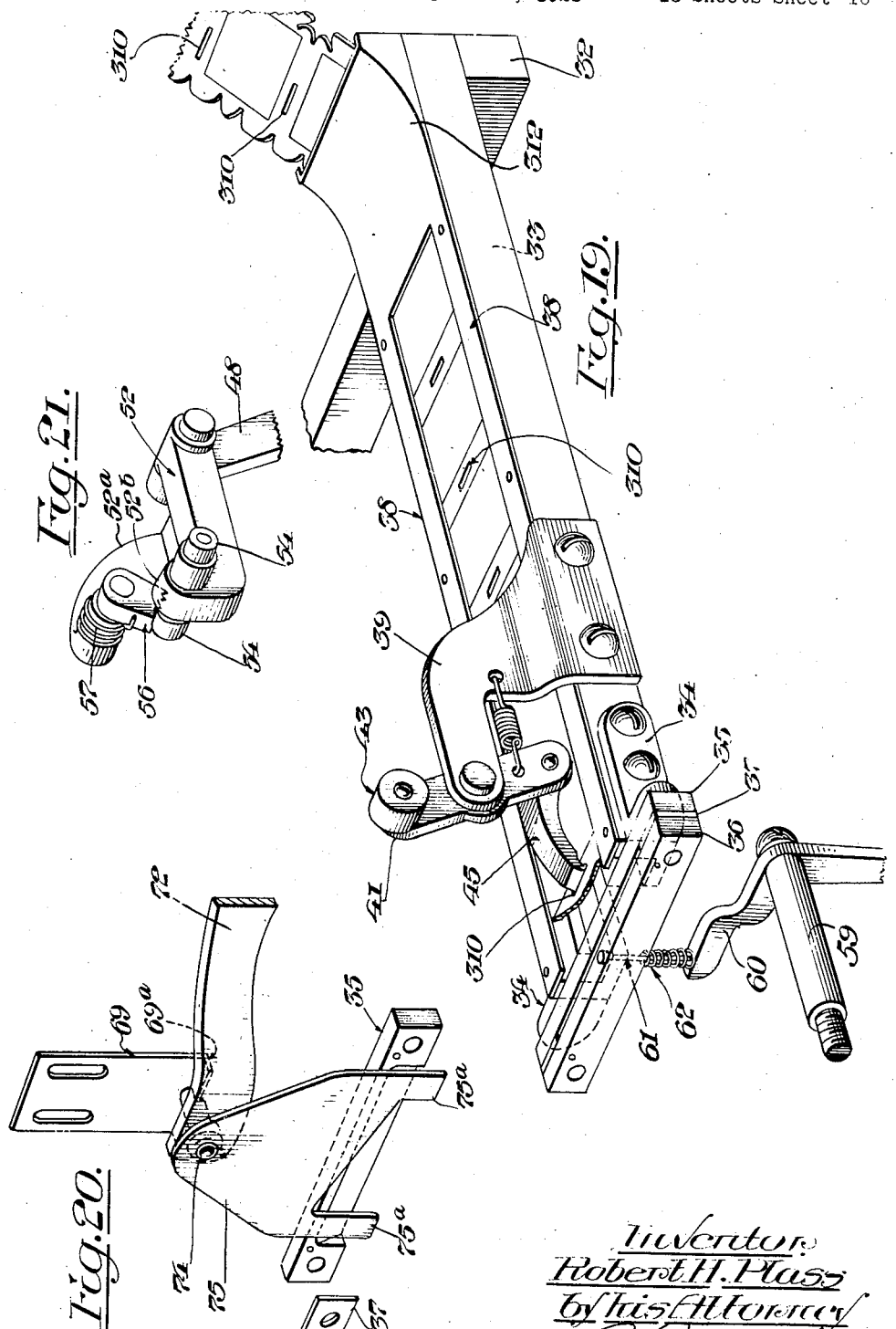

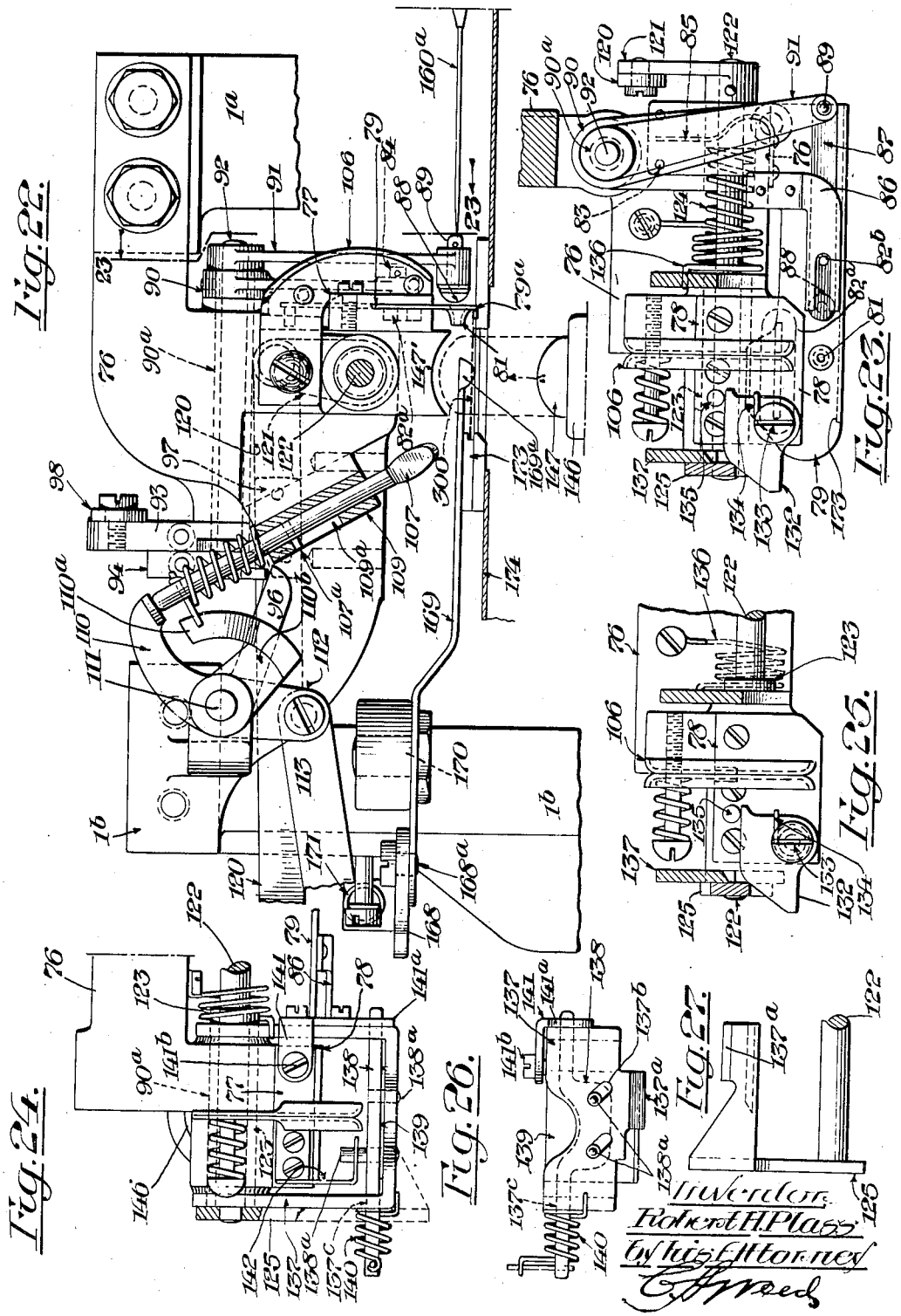

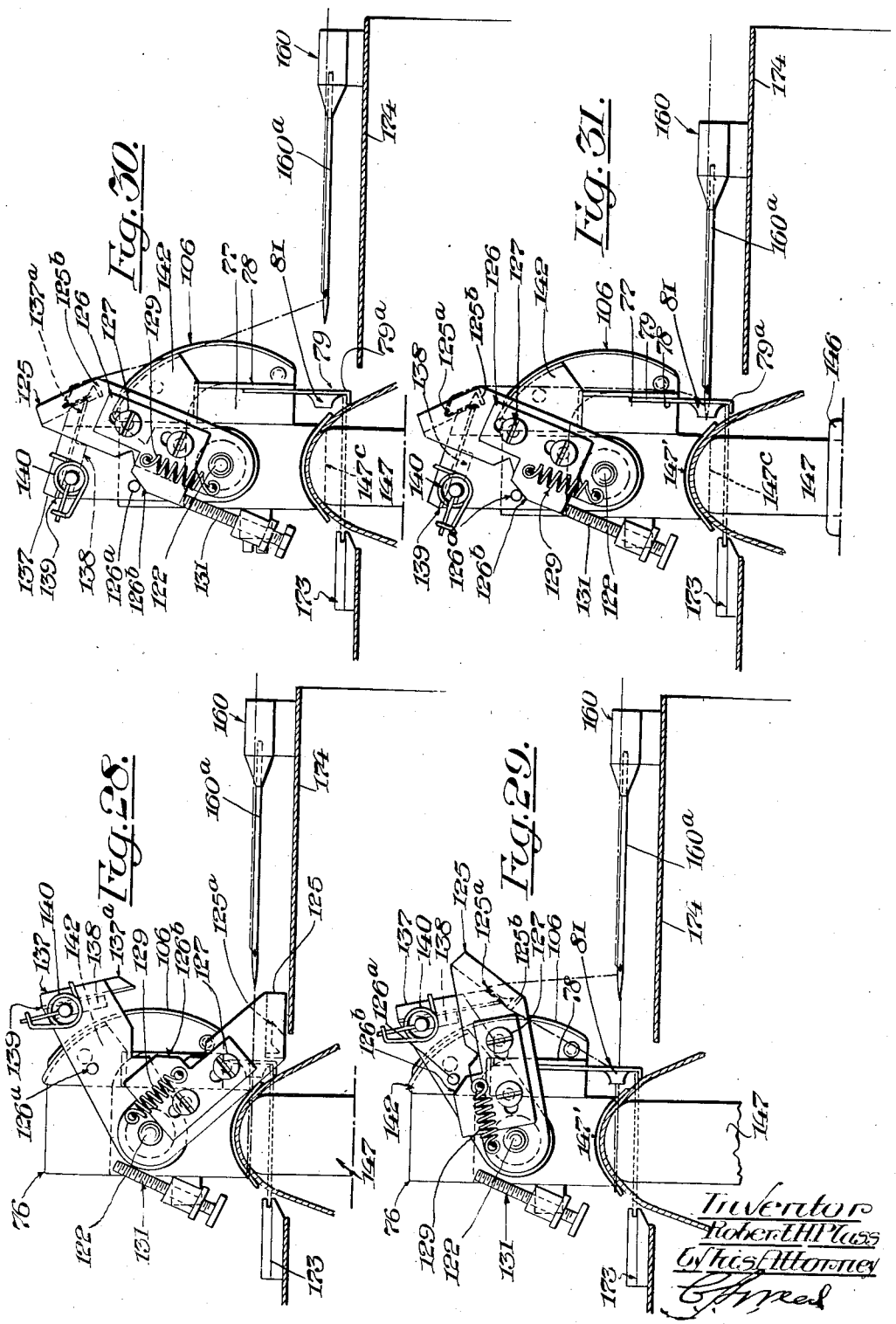

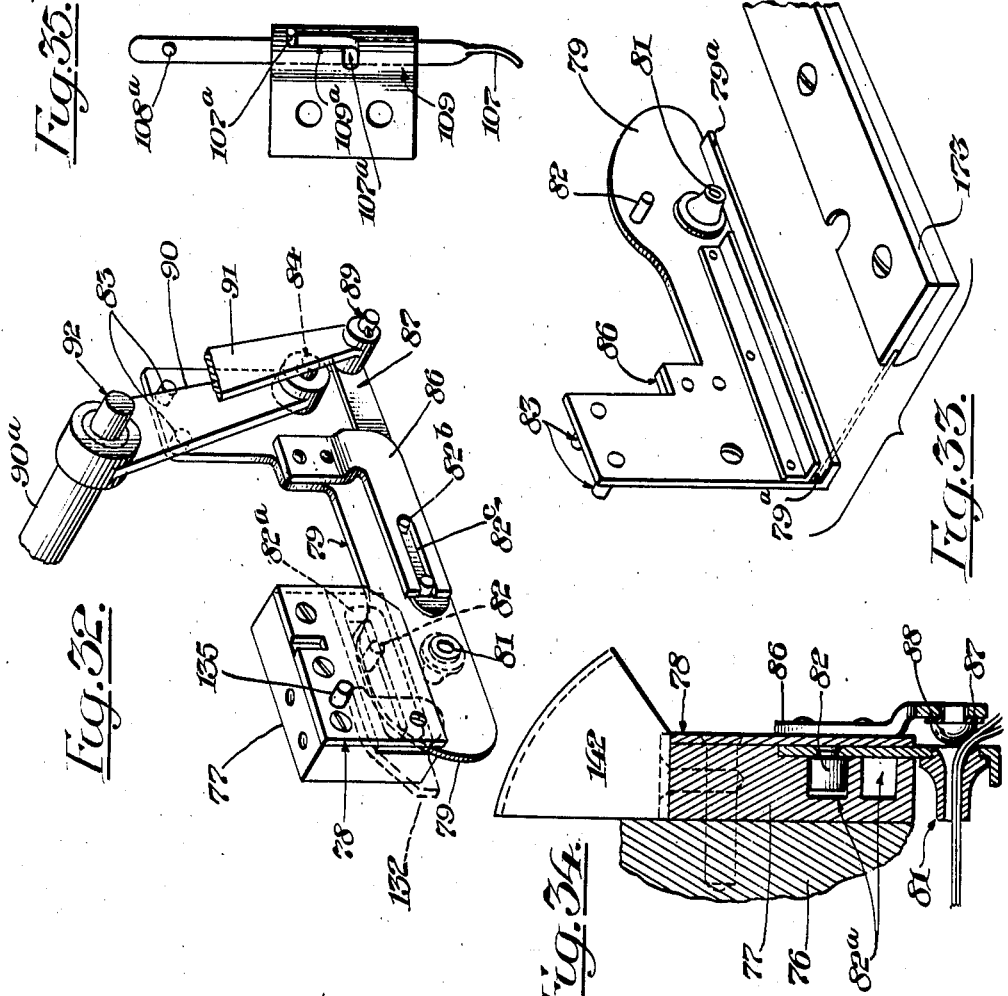

1,815,214

UNITED STATES PATENT OFFICE

ROBERT H. PLASS, OF UPPER MONTCLAIR, NEW JERSEY, ASSIGNOR TO A. KIMBALL COMPANY, OF NEW YORK, N. Y., A CORPORATION OF NEW YORK

PRICE TICKET TIE-ON MACHINE

Application filed April 12, 1928. Serial No. 269,586.

This invention relates to machines for supplying and attaching price tickets or tags and similar articles to fabrics or other articles of manufacture, the object of the invention being to provide a machine that will expeditiously secure a ticket to the fabric or goods in such way that the ticket can be readily removed without severing or ripping the thread or tearing or ripping the ticket from the goods and yet is so held as to prevent premature separation thereof.

One of the objects of the invention is the provision of mechanism that will effectively attach a price ticket or similar article to the goods by means of only a single stitch secured to the ticket as to prevent its premature separation therefrom.

Another object of the invention is the provision of an automatically operative machine that will feed a continuous strip of ticket-forming material into position to be printed and severed into price tickets or tags, then feed the severed tickets into position to be attached to the fabric, and then both stitch and secure on such ticket or tag to the fabric or goods in an expeditious and practical manner, whereby the use of metal staples or pins is entirely done away with, so that any likelihood of injury to the goods and the danger of pricking the fingers in handling or removing the tickets is avoided, and whereby the ticket can be attached in such way that there is but one stitch and only two needle punctures through the ticket and goods, and consequently the ticket may be quickly removed without the necessity of using a knife or other sharp instrument for that purpose, whereby any liability of damaging the goods is avoided.

A further object of the invention is the provision of an improved machine automatically operative to feed a strip of ticket-forming material into position to be printed and severed into price tickets or tags, each of which is then fed into position to be stitched and secured on to the fabric or goods—all the operating mechanisms of the machine being performed in proper sequence and timing and controlled by a single starting means, whereby, when the machine is started, a strip will be fed, a tag will be printed and severed, then fed into position to be attached to the goods, and then stitched and secured to the goods or fabric on each operation of the machine.

Another object of the invention is the provision of an improved compact and readily portable ticket-attaching machine embodying a continuous strip feeding mechanism, a printing mechanism, a severing mechanism for severing the strips into independent price tags or tickets, a tag or ticket feeding mechanism for conveying the printed ticket into position to be attached to the fabric, a shiftable and flexible supporting means or anvil for carrying the fabric into position to have the ticket attached thereto, a stitching mechanism for stitching the ticket to the fabric, looper mechanism for applying a loop of the thread to the nose of the ticket, means for severing the stitch thread and means for securing the severed threads to the tail of the ticket—all of which mechanisms are operated from a single shaft, such as a cam-shaft, under the control of suitable starting means, whereby, when the machine is thrown into operation, the several mechanisms will automatically operate in sequence to secure a ticket to the fabric in an expeditious, practical and effective manner.

In the drawings accompanying and forming a part of this specification,—

Figure 1 is a side elevation of this improved machine;

Fig. 2 is a top plan view thereof with the strip supply roll or reel removed;

Fig. 3 is an enlarged top plan view of the left-hand end of the machine shown in Fig. 2;

Fig. 4 is a left-hand end view of the machine shown in Fig. 1;

Fig. 5 is a right-hand view thereof:

Fig. 6 is a transverse view, partly in section, taken on line 6—6, Fig. 1, looking toward the left, and illustrates the printing, strip severing and ribbon feeding means, a part of which is more clearly illustrated in Fig. 9;

Fig. 7 is a transverse view, partly in section, taken on line 7—7, Fig. 1, looking toward the left, and illustrates the means for operating the strip feeding means, shown more in detail in Figs. 19 and 21;

Fig. 8 is a horizontal sectional view taken on line 8—8, Fig. 1;

Fig. 9 is a transverse view, partly in section, taken on line 9—9, Fig. 1, looking toward the left, and illustrates the printing mechanism including the ribbon feeding means therefor;

Fig. 10 is a detail view of a part of the ribbon guiding means;

Fig. 11 is a detail view of another part of the ribbon guiding means;

Fig. 12 is a detail view of a part of the ribbon feeding means shown in Fig. 9;

Fig. 13 is a detail sectional view of a part of the ribbon feeding means shown in Fig. 9;

Fig. 14 is a transverse sectional view taken on line 14—14, Fig. 1, looking toward the left, and illustrates a part of the driving clutch mechanism for controlling the entire operation of the machine;

Fig. 15 is a transverse sectional view taken on line 15—15, Fig. 14;

Fig. 16 is a detail, partly sectional view taken on line 16—16, Fig. 15, and illustrates a part of the means for connecting the cam-shaft with its driving means;

Fig. 17 is an enlarged side elevation of the strip feeding means;

Fig. 18 is a cross-sectional view taken on line 18—18, Fig. 17;

Fig. 19 is a perspective view of the strip feeding means, the means for preventing the retrograde movement of the ticket strip, the fixed knife or severing means, and the means for raising the rear edge of the ticket after it is severed to permit it to be fed to the attaching means;

Fig. 20 is a perspective view of a part of the strip severing or knife mechanism;

Fig. 21 is a perspective detail view of the strip feeding means;

Fig. 22 is a detail view, partly in section, of the stitching and looper mechanism;

Fig. 23 is a cross-sectional view taken on line 23—23, Fig. 22, and looking toward the left in said figure;

Fig. 24 is a top view, partly in section, of Fig. 23 and illustrates more particularly the thread pull-out and severing means;

Fig. 25 is a detail view, partly in section, of a part of Figs. 23 and 24 and illustrates the cam for shifting the shaft 122 and thereby a part of the thread pull-out means to the left, to avoid contact with the needle during a part of the movement of the latter;

Fig. 26 is a front view of the thread pull-out means shown in Fig. 24;

Fig. 27 is a detail view of a part of the thread pull-out means shown in Fig. 24;

Figs. 28, 29, 30 and 31 are detail views, partly in section, of the thread pull-out and thread severing means shown in Fig. 24 and illustrate the different positions of the needle during its movement toward and from the price ticket and goods;

Fig. 32 is a perspective view of the means for securing or locking the ends of the severed thread to the tail of the ticket;

Fig. 33 is a perspective view of a part of the securing or locking means shown in Fig. 32, this view also illustrating the means for guiding the ticket into position for attachment to the goods;

Fig. 34 is an enlarged vertical sectional view taken through the eye 81, Fig. 32, and illustrates the back tensioning means for the threads;

Fig. 35 is a detail view of the looper;

Fig. 36 is a perspective view of the ticket, the needle and its thread, this figure illustrating the position of the ticket in readiness to be attached to the fabric or goods, and Fig. 37 is a perspective view illustrating a portion of the fabric or goods with the price ticket or tag stitched and tied thereto and shows the thread loop around the nose at one end of the ticket and the severed ends of the thread secured or locked around the tail of the ticket.

Similar characters of reference indicate corresponding parts in the several views.

Before explaining in detail the present improvement and mode of operation thereof, I desire to have it understood that the invention is not limited to the details of construction and arrangement of parts which are illustrated in the accompanying drawings, since the invention is capable of other embodiments, and that the phraseology which I employ is for the purpose of description and not of limitation.

*General description*

This machine comprises in a general way the following combined mechanisms, all cooperating to feed, print, sever, supply and attach a ticket to the goods in an improved and expeditious manner: (1) suitable strip supply means, in the form of a reel, for supplying a continuous strip of previously formed price tickets or tags to the machine; (2) strip feeding mechanism embodying means for preventing the backward or retrograde movement of the strip during the rearward movement of the feeding means; (3) printing mechanism for printing the desired data on the successive tickets or tags of the strip, included within which is a suitable means for inking the type, shown in the form of automatically operative ribbon mechanism; (4) ticket severing mechanism for cutting off the printed ticket from the succeeding blank tickets of the strip, and which severing mechanism in the preferred form shown is operated by a part of the printing mechanism; (5) individual ticket feeding mechanism for carrying the ticket from the printing mechanism into position to be attached to the fabric or goods, and which feeding mechanism includes means for raising the rear edge of the ticket into position to be engaged by this feeding means; (6) fabric supporting means shown in the form of a shiftable and flexible anvil, whereby the liability of the operator being injured is avoided; (7) stitching mechanism for stitching the ticket to the fabric, and embodying a looper mechanism for applying the loop of the stitch to the nose of the ticket and suitable tensioning means for the thread; (8) mechanism for securing or locking the severed stitch thread to the tail of the ticket, and including tensioning means for holding the threads to permit the same to be properly tied to the ticket; and (9) thread pull-out mechanism for pulling or drawing out the necessary thread, and including severing means for cutting the thread. All of these mechanisms are so organized and cooperate in a single machine that the ticket is attached to the goods by a single stitch, requiring but a pair of needle punctures, and such ticket maintained against premature separation by the securing or locking of this stitch to the ticket, but in such way that the ticket may be readily removed from the goods by a slight manipulation of the thread and without the use of a sharp instrument, thus avoiding all liability of injuring the goods, and whereby also, as hereinbefore stated, the necessity of using wire staples or pins or other metallic fastening means and the consequent danger thereof is entirely avoided. The driving means for this machine, in the preferred form thereof, comprises a single electric motor-driven shaft carrying a series of cams for operating the several mechanisms and, therefore, properly termed herein a "cam-shaft", under the control of a suitable starting means, including suitable clutch mechanism, and controlled in the present instance by a single lever preferably so located that at the time the operator places the goods upon the supporting means or anvil in readiness to be carried into position to have the printed price ticket attached thereto, he can simultaneously shift this lever by a slight movement of his hand, thus starting the machine into operation. When the machine is thus started during a single revolution of the cam-shaft, the strip will be fed forward to carry the end ticket of the strip or gang of tickets into position to be printed and severed from the strip, its rear edge raised into position to be engaged by the ticket feeding means, as distinguished from the strip feeding means, and thereby carried into position to be attached to the fabric or goods carried by the shiftable anvil into contact with the ticket, and which anvil is so formed, together with a fixed anvil, as to convex or curve the ticket and goods for the insertion of the needle, whereupon the needle operates to carry the thread through the ticket and goods, puncturing both with but a pair of holes. At this time the needle loop is carried by the looper around the nose of the ticket and upon withdrawal of the needle the opposite ends of the thread are severed and the free ends of the thread carried by the securing or locking mechanism around the tail of the ticket, so as to secure or lock the threads thereto in such manner that they cannot become prematurely loosened, whereupon the machine stops until the starting lever is again moved. All of the foregoing mechanisms are properly timed to operate in sequence automatically to stitch and secure a price ticket to the goods by a single stitch.

The framework

The various mechanisms embodied in this machine are mounted upon a suitable supporting frame or framework, of which it is unnecessary to give a detailed description. This supporting frame is preferably formed of suitable castings especially designed for the purpose, and in the present instance the main frame, Figs. 1, 4 and 6, comprises a suitable bed or base 1 upon one end of which an electric motor 350 is located, a pair of uprights or standards 1ª and 1ᵇ preferably integral with the base 1 and connected at their tops by a bolted cross-frame or casting 76, suitable housings 2 and 3 for the driving and clutch mechanism, and a suitable anvil-supporting casing or frame 146 also carried by the base 1, it being intended to cover the major part of the machine by a suitable cover or housing (not shown).

The price ticket or tag

A form of price ticket or tag, various kinds and sizes of which may be used, is shown and described in my contemporaneously-pending application, Serial No. 225,155, filed October 10, 1927, and comprises, Figs. 36 and 37, a rectangular blank 300 of suitable material, such as flexible cardboard. One end of this blank is serrated or notched to provide a pair of notches 301 and 302 forming a spaced tongue or nose 305 for the reception of the loop of the needle thread. The opposite end or side of the tag is provided with a pair of diagonal notches 306 and 307 forming a dovetailed projection or tail 308 of preferably greater width than the nose, and these tail notches are provided for securing and locking the severed ends of the thread or stitch to the tag after the same has been stitched to the goods by a single stitch 309. These notches 306 and 307 must be small enough to effectively pinch and, therefore, lock the thread, while the notches 301 and 302 must be sufficiently large to permit the loop of the thread to slip freely onto the nose 305 of the ticket. These tickets are preferably formed in a continuous strip sufficiently long to provide from one to five thousand tickets, the tickets in the strip being separated from one another by locating slots 310, Fig. 19. This strip of tickets is reeled upon a roll 7 which is inserted into a suitable magazine 4, Fig. 1, and mounted to turn upon a stud 8. The magazine is closed by a hinged cover 5 suitably secured by a nut 6. This magazine is attached to one end of the machine and therefrom the free end of the strip of tickets is lead to the machine and enters the same under a suitable guide-plate hereinafter referred to.

The machine in cutting off a ticket takes out a one-thirty-second inch ($\frac{1}{32}''$) between each ticket at the point of the locating slot 310 and leaves a smooth edge on the cut lengthwise sides of the ticket.

The strip feeding mechanism

As hereinbefore stated, the free end of the strip of tickets enters the machine through a suitable chute 312, Figs. 1, 17 and 19, the top of which terminates in a horizontal guide-plate 38 secured to the top of a pair of parallel guideways 33, Figs. 17, 18 and 19, and under this guide-plate 38 and in suitable grooves 33ª, Fig. 18, of the guide-ways 33 the strip is fed to the severing and printing mechanism by the strip feeding mechanism. These guide-ways are supported at their outer ends by a cross-bar or member 32 bolted to the clutch housing 3 and have their opposite ends secured to the frame by suitable angle-plates 34, being spaced apart the proper distance to accommodate the desired size of ticket. The feeding mechanism, illustrated in detail in Figs. 1, 7, 17, 19 and 21, comprises a feeding member 52, the upper end of which is slidably supported in the guide-ways 33 by stud-carrying rollers 54. The opposite end of this feeding member 52 is pivotally connected to a lever 48 pivotally secured at its lower or sleeve end to an arm 51 fixed to the base 1, and the sleeve of this lever 48 is provided with an upright arm 49 having a suitable roller 50 in position to be engaged by a cam 201 located on a driving or cam-shaft 208, Figs. 1 and 17, whereby the lever 48 is rocked back and forth, thereby to slide the feeding member in the guide-ways 33.

The feeding member 52 has at one side an extension 52ª reaching upward, on the upper end of which is pivotally secured a pawl or toothed member 56 held in its working position by a suitable spring 57. The upper end of feeding member 52 is also so shaped, as at 52ᵇ, that the ticket strip is grasped firmly between this shaped end 52ᵇ and the toothed member 56, so that as the feeding member 52 is shifted forward, the strip will be fed forward step by step the required distance, retrograde movement with the feeding member 52 being prevented by a pawl 45, Figs. 17 and 19, dropping into the locating slot 310 of the ticket strip. The point of this pawl 45 is normally located directly under the knife 75, Fig. 20, at the time that the strip would have a tendency to be shifted backward by the feed member 52, thus locating the ticket in the exact position under the knife blade where it is to be cut, and, therefore, this pawl 45 has to be moved out of the path of the knife before the latter descends and for this purpose it is pivoted to one end of a lever 41, which in turn is pivoted to a bracket 39 secured to one of the guide-ways 33. The upper end of this lever 41 is provided with a roller 43 held against a suitable cam 58 by a spring 46 and this cam 58, Fig. 17, is secured to the printing-press arm 64 which also operates the knife 75. As this printing-press arm 64 and knife 75 move down to print and sever the ticket, the pawl 45 is shifted out of the path of the knife edge by this cam 58, which is suitably shaped for this purpose, and when the printing-press arm and knife move upward, the lower portion of the cam engages the roller 43 and shifts the upper part of the arm 41 rearward, or to the right in Fig. 17, and thereby carries the lower end thereof with the pawl 45 into position to engage the locating slot 310 at a point directly under the knife 75 when the feeding mechanism has shifted the strip forward.

From the foregoing it will thus be seen that the ticket or gang strip is fed forward step by step by the feeding mechanism, comprising the feeding members 52 and 56, into such position that the locating slot 310 is just below the knife 75, at which time the pawl 45 for preventing backward movement of the strip falls into a locating slot 310 and so arrests the backward movement of the strip as the feeding mechanism moves backward to again feed the strip forward, and as the printing-press arm 64 and knife 75 descend, this pawl 45 is shifted out of the way of the knife.

The knife or strip severing mechanism

The upper knife 75, Fig. 20, is provided or formed with two depending guide-ends 75ª, and the cutting edge of the knife is on an angle and is made square or double-edged so that in separating a ticket from the strip it will cut out substantially one-thirty-second inch of stock between the tickets; in other words, it will cut out the locating slot 310 and leave the lengthwise sides or edges of the ticket smooth. This knife is guided between and co-operates with a pair of fixed lower knives 35 and 36, Fig. 19, suitably spaced apart by spacers 37 and secured to a part of the frame by screws. Riveted to the upper end of the shiftable knife 75 is a pivot screw 74, by means of which the knife is pivotally secured to a lever 72, the opposite end of which is pivoted by means of a stud 73 to a part of the frame.

Secured to the pivoted printing-press arm 64, Figs. 6 and 20, is an angle-plate 69 having its lower angle-formed end 69$^a$ in position to catch under an extension of the pivot screw 74 on the upward stroke of the printing-press arm 64 and thus lift the knife up. On the downward stroke of this printing-press arm 64 a set-screw 64$^a$, carried by the arm 64, Figs. 6 and 17, engages the knife-carrying lever 72 and thus pushes the knife down to sever a ticket or tag from the strip. Thus, as the printing-press arm 64 descends, the set-screw 64$^a$ forces the knife downward, and as this arm ascends, the angleplate 69 carried thereby engages the end of the pivot screw 74 of the knife blade and raises it.

The printing mechanism

The printing-press arm 64, Figs. 1, 6 and 9, is pivoted by a stud 65 to an extension 1$^c$, Fig. 4, of the upright frame member 1$^b$ and has a stud-carrying roller 68 at its lower end in position to be engaged by a cam 202 secured to the cam-shaft 208. The stud 65 has an offset center, Fig. 6, relatively to its bearing in the extension 1$^c$ and is held stationary therein by a set-screw 65$^a$. By turning this stud 65 in its bearing the impression of the type carried by the printing-press arm 64 can be varied. Carried by the arm 64 is a suitable chase 65$^b$ for the reception of the type 65$^c$. This chase has a projection or extension 70$^a$, Fig. 9, extending into the arm 64 and is held in position by a retaining member 70 whereby it may be easily removed for the reception of the type. A suitable rubber pad 65$^d$ is located in the frame and serves as a platen for the impression.

The inking mechanism

In the present machine a ribbon 65$^e$ is used for inking the type. This whole ribbon mechanism, Figs. 6, 8 and 9 to 13, is mounted on a plate 180 secured to one of the upright frame members by studs 179. The ends of the ribbon are secured to a pair of fiber bushings 185 mounted upon suitable sleeves or bushings 182 and secured thereto by pins for preventing the turning of the bushings 185 relative to the bushings 182. These sleeves or bushings 182 are fast to a pair of gears 181, which act as one side-guide for the ribbon, suitable disks 183 forming the opposite side-guides. Each of these spools made up in the manner just described turns on a stud 184 secured in the plate 180, which studs carry suitable thumb-nuts 186 for holding the assembled parts together. The ribbon 65$^e$ passes from one spool—as, for instance, the full spool—to the other spool over suitable guides, which may be in the form of posts or rolls, as preferred; it first passing over guide 187, Fig. 9, thence under a guide 59, then through ribbon guides 175 and 178, and then over a guide 187$^a$, whereupon it is rolled upon the other spool. When one spool is loaded, the ribbon mechanism is automatically reversed and this is accomplished in the following manner: To the plate 180 a ribbon-spool-operating lever 188 is pivoted, as at 189, which lever has at its lower end a pair of notches 188$^a$, with either one of which the bent end of a spring 210 engages. This lever 188 is so formed or shaped as to provide a bearing 190 for a short shaft 192, and fast to this shaft is a gear 191 and a ratchet-wheel 193, Figs. 9 and 13. Pivotally mounted on this shaft 192, between the ratchet-wheel 193 and bearing 190, is a lever 194, to the lower end of which is pivoted, by means of a stud 195, a pawl 196 which is held in engagement with the ratchet-wheel 193 by a spring 200 carried by a stud 199 fastened to a link 197, one end of which is mounted on the stud 195 of the pawl-operating lever 194 and the other end of which is secured by a stud 198 to a lever 153, by means of which the ribbon mechanism is operated. In other words, as the lever 153 is shifted back and forth, it operates through the connecting link 197 to move the pawl 196 and thereby rotate the notched wheel, step by step, and consequently the gear 191, which in turn rotates that particular spool gear 181 with which it is at the time in mesh.

The lever 153 is rocked back and forth by a connecting link or lever 152, Fig. 4, through the medium of a cam 203 on cam-shaft 208, and which will be referred to more in detail hereinafter since this same lever 153 also reciprocates the needle-holder and its needle.

The ribbon-spool-operating lever 188 is bent at an angle at its upper end, as at 188$^d$, Figs. 9 and 13, and has two slots therethrough, 188$^c$ and 188$^b$, Fig. 9, and through these slots the ribbon passes. This ribbon has an eyelet or enlargement 65$^f$ adjacent to each end, each sufficiently large to prevent its passing through the slots. When either of these enlargements strikes the bent part 188$^d$ of the lever 188, it shifts this lever on its pivot 189 so as to shift the lower end of the lever and thus bring one or the other of the two notches 188$^a$ in engagement with the spring 210, and this shifting movement, of course, shifts the gear 191 from its position in mesh with one of the spool gears 181 to a position where it will mesh with the opposite one, whereby the ribbon spools are reversed and, consequently, the ribbon. The ribbon guide 175 is pivoted on a fixed stud 176ª secured to an upright frame member in a similar manner to that shown in Fig. 10, and on this stud is located a spring 177 which tends to push the ribbon guide in the direction of the arrow, Fig. 9. This ribbon guide has its lower end 175ª in position to touch the printing-press arm 64, Fig. 9, so that when the arm is lifted it forces the lower end of this ribbon guide 175 in a direction to lift that point of the guide nearest to the type and against the action of the spring 177, thereby to raise the ribbon away from and above the ticket that has just been printed.

The ticket feeding or forward-passing mechanism

Assuming that the ticket has now been printed and severed from the strip at the position A, Fig. 1, it now has to be shifted or fed to the position designated by B, Fig. 1, at which point it is to be attached to the goods. The guideplate 38 and grooves 33ª of the guide-ways 33, Figs. 18 and 19, and the ribbon guides 175 and 178, Fig. 9, have held and guided the strip and its ticket into position over the supporting pad 65ᵈ, Fig. 9, where, as hereinbefore stated, it is printed and severed. For now feeding the severed and printed ticket forward from position A to position B, where it is to be attached to the goods, a horizontally-located ticket feeder, in the form of a lever 169, is provided, Figs. 3 and 4, pivoted by a stud 170 to a part of the framework. The shorter end of this lever is pivotally connected with a lever 168 by a stud 168ª, Figs. 2 and 3, and this lever 168 is connected between its ends to a lever 164 by means of a stud 164ª, Figs. 2 and 6, and lever 164 in turn is pivotally supported by a stud 165, Fig. 6, fast to the frame. At its lower end this lever 164 is provided with a roller 166 turning on a stud 167, Fig. 6, in position to be engaged by a cam 206 mounted on the cam-shaft 208, and roller 166 is held in engagement with this cam 206 by a coiled spring 171, Figs. 2 and 3, secured at one end to the frame and at its opposite end to an upturned end of the lever 168. The ticket-feeding lever 169 has a downwardly-projecting lip 169ª on its free end, Figs. 3 and 4, which engages behind and underneath the severed and printed ticket when in position A and pushes it into position B, Fig. 1. To ensure the proper engagement of this lip with the rear edge of the ticket, a small pusher 61, Figs. 6, 9, 17 and 19, is provided. This pusher is located in the left lower fixed knife blade 36 and is lifted up at the proper time by an angle lever 60 pivotally supported on the frame by a stud 59, and this angle lever 60 is actuated by a nose 205 on the outside of cam 202 carried by cam-shaft 208. A spring 62 is carried by the pusher 61 to ensure the return of the pusher to its normal position. This pusher is located directly under the ticket adjacent to the rear edge thereof where the lip 169ª of arm 169 engages the ticket and lifts or bends the ticket up at the moment the lip of this arm 169 is in position to slip under the ticket, thus ensuring the proper engagement of the ticket with the feeding arm 169. On the travel of the ticket from position A to position B, Fig. 1, the ticket is guided by the guides 79ª and 173, Figs. 22 and 23, of the hereinafter-described securing mechanism and thus guided into proper position for the operation of the stitching and tying-on mechanism.

The anvil mechanism

By the ticket feed lever 169 just described the ticket is fed to the position B, Fig. 1, where it is directly over a suitable shiftable anvil 147, Figs. 1, 2 and 4, and is held between the guides 79ª and 173 just referred to. The operator holds the goods or fabric between his hands and lays them over this anvil 147, which thus brings his right hand into position to touch a lever 130 and push it back slightly, which actuates the clutch mechanism in the housing 203 and causes the cam-shaft 208 to make one revolution, thereby feeding the strip in position to have a ticket printed and severed and carried forward into position over the anvil in readiness to be attached to the fabric. This starting and clutch mechanism will be hereinafter described. As the anvil 147 is also connected with the camshaft 208 in the manner about to be described, it is shifted upwardly, carrying the goods with it and pushing the ticket out of the guides 79ª and 173 until both the goods and the ticket are clamped between the lower anvil 147 and an upper anvil 147'—see, for instance, Figs. 4 and 28. The top of anvil 147 is formed convex and the bottom of anvil 147' is concaved, thereby to curve or convex the ticket in the manner shown in Figs. 28, 31 and 36. The anvil 147 is mounted within a casing or housing 146 carried by the base 1 and consists of a slotted and sleeved head connected to an upright shaft 148, the upper end of which projects into and is slidably engaged with the anvil 147. Rotary movement of the anvil 147 is prevented by pin 147ᵇ carried by the shaft 148 which projects into the slot 147ª of the anvil 147. The upward movement of the anvil is obtained by a cam 204 on cam-shaft 208, and the movement of this cam is translated through a roller 144 carried by a stud 145 fast to a lever 143 which is pivoted at 117 to the frame of the machine. The free end of this lever 143 is slotted or forked, as at 143ª, to engage a stud 150 riveted to the upright anvil shaft 148 which, as hereinbefore stated, is slidably engaged with the anvil 147. A coiled spring 149 located around the anvil shaft 148 and below the anvil 147, holds this anvil in its topmost position on the shaft 148 and thus provides sufficient flexibility for the anvil to accommodate different thicknesses of goods and also prevent injury to the operator's hand should it be caught between the shiftable and fixed anvils. The lower anvil 147 has a notch or slot 147ᶜ, Fig. 1, to provide clearance for the needle.

By this construction the fabric or goods is shifted upwardly at the proper time to be clamped, together with the ticket, against the fixed upper anvil 147' and curved in the manner described for the stitching and tying operation.

The stitching mechanism

This mechanism includes a needle which passes through the ticket and goods held between the anvils, the clearance slot 147ᶜ hereinbefore referred to providing for the passage of the needle, and this is the first step in securing the ticket to the goods. The needle 160ª is secured to a holder or slide 160, Figs. 1, 2, 4 and 28 to 31, and this needle-holder slides between a gib 161, Figs. 1 and 17, and a similarly formed part of the frame. To the needle-holder 160 a stud 159 is secured, and this stud passes through a slot 11ª, Figs. 4 and 17, in the frame and has its opposite end connected by stud 158 to a link 157 which is connected to the lever 153. This lever, which also operates the ink ribbon mechanism, Fig. 9, is pivotally connected by a stud 154 to the frame, Figs. 1 and 4, and is pivotally connected by a stud 156 to a link 152, to which motion is imparted by a cam 203 mounted on cam-shaft 208 in engagement with a roller 154' carried on stud 155' fixed to the lever 152. The free end of this lever 152 is forked for the reception of a square bearing or box 151 splined to the cam-shaft 208 which reduces the wear of the fork relatively to the shaft. Thus, as cam 203 is rotated, the needle-holder 160 and its needle are reciprocated by the levers 152 and 153 and link 157. Suitable spring-controlled thread tension disks 211 are mounted on the needle-holder 160 for movement therewith, Figs. 4 and 17, and the needle thread passes between these disks, being guided to and therefrom by a pair of pins 211ª and 211ᵇ, Figs. 2 and 17, the thread preferably coming from a suitable supply carried independently of the machine—for instance, by a spool stand.

When the needle is out of the work and all the way back—for instance, in the position shown in Fig. 2—these tension disks do not tension the thread, being held apart at this time by a suitable wedge 209ª carried by a fixed bracket 209, Fig. 4, which, therefore, does not move with the needle-holder. Thus, when the needle-holder moves backward and carries the tension disks into engagement with the wedge 209ª, this wedge moves the disks apart and so releases the tension upon the thread. When, however, the needle moves forward so as to carry the tension disks 211 away from the wedge, the thread is placed under tension, so that in all positions of the needle, other than its extreme rearward position, the thread is under tension.

The looper mechanism

A suitable looper 107, Figs. 4, 22 and 35, is carried by a bearing 109 and is provided with a combined torsion and compression spring 108 tending to force the looper upward, as well as turn it, when the looper is depressed. The lower end of this spring 108 engages the bearing 109, while its upper end is hooked to a pin 108ª driven into the shank of the looper. Also driven into this looper shank is a pin 107ª free to slide in an angularly-formed slot formed in the bearing 109, Fig. 35. Thus this spring will return the looper to its normal position and also, when the looper is depressed, by the means hereinafter described, turn or rotate it a short distance. For operating the looper in the opposite direction, or against the return action of the spring, a looper actuator or pusher 110 is mounted on a looper shaft 111 having a bearing in frame member 76. Secured to this shaft 111 is an arm 112 pivotally connected to a link 113, the opposite end of which link is pivotally connected to a lever 114 having its lower end pivotally connected to a long stud shaft 117 mounted in a hub of the frame, Figs. 2, 3 and 4. This lever 114 is provided with a stud-carrying roller 115 held, by means of a spring 162, Fig. 4, in engagement with a double cam 204, which also operates the anvil 147 and is carried on the cam-shaft 208, Fig. 4. When the needle, after passing through the ticket and goods, starts on its return stroke, the thread forms a loop at the eye of the needle, owing to the friction of the work upon the thread, and at this moment the looper pusher 110 pushes the looper down, compressing the spring 108, and thereupon the lower end of the looper enters the loop of the thread. When the pin 107ª of the looper reaches the corner of the angular slot 109ª, Fig. 35, the looper is free to turn and makes a quarter turn, owing to the action of the torsional spring 108. This quarter turn of the looper opens the loop of the thread, and as the point of the looper is bent toward the nose of the ticket, the loop of the thread slips off of the looper and passes over the ticket nose 305, Fig. 37. As the pusher-operating arm 110 moves up, a cam-shaped member 110$^a$, Fig. 22, carried by another arm 110$^b$ of the looper-pusher 110 comes in contact with the pin 108$^a$ of the looper shank and turns the looper back a quarter of a turn until this pin 107$^a$ reaches the straight part of the slot 109$^a$, whereupon the spring 108 forces the looper up into its normal position. Thus by this means the loop of the thread, Figs 36 and 37, is carried over the nose 305 of the ticket. As this reciprocating looper also turns back and forth, it may be properly considered as a rotary or oscillating looper.

Thread pull-out or slacker mechanism

Carried by a shiftable member 79 forming part of the thread securing means hereinafter described, Figs. 23, 32, 33 and 34, is guide eye 81 through which the needle passes and is guided into the ticket and goods. For the operation of this thread securing mechanism it is essential that a sufficient amount of thread be pulled out and severed so that the loose ends of the thread can be secured around the tail of the ticket. This thread pull-out and thread severing means, Figs. 24 to 31, comprises a swinging jaw member 125, Fig. 27, fast to a rockable and slideable shaft 122 passing through a bushing 123 carried by frame casting 76, Figs. 4, 22 and 23. Surrounding this shaft is a coiled spring 124. At one end the shaft has secured thereto an arm 121, Figs. 4 and 23, the hub of which extends into and is pivotally supported in the frame 76 and forms a bearing for the shaft 122. This shaft 122 is shifted endwise in one direction, as toward the left, by a cam 132, Fig. 25, hereinafter described, and in the opposite direction, or to the right, by the coiled spring 124. The shaft arm 121 is pivotally connected to a link 120, Fig. 4, which in turn is pivotally connected to a lever 119 having a stud-carrying roller 115′ held against the double cam 203, mounted on camshaft 208, by a spring 162 and the lower end of this lever 119 is pivoted to the long stud shaft 117. Co-operating with this swinging jaw member 125 is a winging U-shaped jaw member 137, Figs. 3, 24 and 26, the ends of which are pivotally supported by the bushing 123 carrying the shaft 122. This U or yoke-shaped member is provided in the center thereof with a downward extension 137$^a$, Fig. 26, which co-operates with the edge 125$^a$ of the swinging member 125, Fig. 27. When the swinging member 125 is swung upward, these co-operating parts 125$^a$ and 137$^a$ meet and take a firm grip on the thread between them, Fig. 29. Carried by the swinging member 137 is a thin knife blade 139, Fig. 28, somewhat similar to a shortened well known razor blade. This blade 139 is provided with a pair of holes. An endwise-shiftable knife-carrying member 138 is provided with a pair of projecting ends, one supported in a slot 137$^c$ of the swinging yoke 137, Figs. 24 and 26, and the other by an angular bracket 141 screwed to the yoke 137. This endwise-shiftable knife-carrying member 138 is provided with a pair of pins 138$^a$ which pass through the holes in the knife blade 139 and thence into a pair of inclined slots 137$^b$ of the yoke 137 and in which slots the pins slide. One of the pins, as 138$^a$, Fig. 24, extends backward into position to engage a fixed cam 142 during the upward movement of the yoke 137, whereby the knife-carrying member 138 and the knife or blade carried thereby is shifted endwise to give a shearing cut to the thread and so cut it off at the proper time. A spring 140 holds the lower part of the knife-carrying member 138 against the yoke 137 with the knife 139 between them and returns the blade and carrying member 138 to its normal position. Thus it is apparent that during the upward stroke of the yoke 137, the knife 139 has imparted thereto a down and side motion by the fixed cam 142 and inclined slots 137$^b$ and thus cuts the thread at a predetermined time, Fig. 29, the co-operating swinging jaw member 125 having an extension 125$^b$, Fig. 28, which supports the thread while being cut. For limiting the downward movement of the swinging yoke 137, the bracket 141 carried thereby has an extension 141$^a$ provided with a set-screw 141$^b$ in position to engage a block 77 carried by the frame member 76, and which block supports the shiftable thread securing member 79 hereinafter described, Fig. 32, while a spiral spring 136, Figs. 3 and 23, secured at one end to the frame 76 and at its opposite end to the yoke 137, being partly coiled around the shaft 122, tends to force down the yoke jaw 137, while the cam 203, lever 119, link 120, arm 121 and shaft 122 operate to swing the co-operating member 125 up and down.

When the needle 160$^a$ enters the guide eye 81 carried by the thread securing member 79, the yoke 137 and its co-operating jaw member 125 are near their top position, Fig. 31, with the end of the thread held between them. Just prior to this, the needle was in a position substantially similar to that shown in Fig. 28, with the yoke 137 and swinging jaw member 125 in the position there shown. As the needle advances from the position shown in Fig. 30 to the position shown in Fig. 31, the thread enters between a pair of tension blades 106, Figs. 3 and 22 to 31, and the thread end is thus prevented from falling down after the thread is cut and released by the jaws 125 and 137 which must release it as the needle goes in further. The swinging jaw members 125 and 137 have a slight further upward movement from that shown in Fig. 31 for the purpose of releasing the thread. This is obtained during this further short upward movement of the jaws 125 and 137 by a set-screw 131, Figs. 28 to 31, fixed to the frame member 76 in position to strike a sliding member 126 carried by the swinging jaw member 125. This sliding member 126 is connected to the side of the swinging member 125 by a pair of screw-studs 127 passing through elongated slots of the sliding member 126, and a spring 129 connects one end of this sliding member to the swinging jaw member 125. As the slide 126 during this further slight upward movement of the jaws 125 and 137 strikes the set-screw 131, Figs. 30 and 31, this slide 126 is shifted upward, thereby carrying its inclined or cam-face 126$^b$ into engagement with a pin 126$^a$ carried by the yoke 137, which thus opens the swinging members 125 and 127 sufficiently to release the end of the thread.

*The action of the needle*

The position of the needle in Fig. 30 is its idle position. As hereinbefore stated, it makes but one stitch in each ticket, passing through the ticket and goods and then back. In Fig. 31 it has entered the guide eye 81, a portion of the free end of the thread being held between the tension blades 106 hereinbefore described, the swinging jaws 125 and 137 having been sufficiently opened to release the end of the thread. The tension disks 211 mounted on the needle-holder 160 have closed and thus hold the thread in the rear of the needle. The needle then makes its full stroke through the work, and during its return a thread loop is formed, and by means of the reciprocating and rotating looper hereinbefore described this loop is carried over the nose of the ticket. As the needle returns to its original or starting position, the loose end of the thread is still held between the tension blades 106, Fig. 28.

During the time of the needle action, the swinging jaw 125 has had its downward stroke, the yoke 137 moving with it by reason of the spring 136 pressing it downward until the set-screw 141$^a$ strikes on the block 77 carried by the frame member 76, thus stopping further downward movement of the yoke jaw 137. The swinging jaw 125, however, goes on downward to the position shown in Fig. 28. During such downward movement, however, it would strike the needle as it comes out of the ticket, since that part 125$^a$ of the swinging jaw 125 extends across the path of the needle. Therefore, to have this part 125$^a$ avoid the needle, a cam 132, Fig. 25, is located in position to engage the side of the swinging jaw 125 and thus shift it to the left so that jaw 125$^a$ during its downward movement will move around the needle, which, as hereinbefore stated, is permitted by reason of the fact that the shaft 122 for swinging this jaw 125 is a slideable shaft, being shifted to the left by the cam 132 and to the right, or back to its normal position, by the spring 124, Fig. 23. Thus, after the jaw 125 has passed the cam 132, it is shifted back, or to the right, by the spring 124 to bring the part 125$^a$ of the jaw under the thread as it extends from the needle to the work, Fig. 28. This cam 132 is pivoted on a stud 133 and is held in position by a spring 134 which forces it against a stop 135, Fig. 25. On the upward movement of the jaw 125, this cam is shifted out of the way by the jaw 125 without giving any side motion to the jaw 125. When the jaw 125 rises from the position shown in Fig. 28, the tension disks 211 hereinbefore described are held open by the wedge 209$^a$, Fig. 4, and during this upward movement of the jaw 125, it pulls out the thread until the jaw 125 meets the yoke jaw 137, whereupon the thread is held between the two jaws and is then cut in two, but the swinging jaws 125 and 137 keep on going up, pulling in more thread by reason of the cooperating parts 125$^a$ and 137$^a$ until they reach the position shown in Fig. 30, this being the starting or idle position, at about which time the jaws are slightly opened through the medium of the set-screw 131, sliding member 126 and pin 126$^a$ in the manner hereinbefore described to release the severed thread end.

*The thread securing or locking mechanism*

The loose ends of the thread are now projecting out of the needle guide eye 81, Fig. 34, which, as hereinbefore stated, is carried by a sliding plate 79 about one-thirty-second of an inch thick, Figs. 32 to 34. The general shape of this plate is shown in Fig. 33. This plate is slidingly supported by the block 77, Figs. 32 and 34, secured to the frame member 76, being slidingly held to this block 77 by an overlapping plate 78 and between which block and plate the thread securing member 79 slides. The bottom of this sliding plate 79 is formed to provide one of the guideways 79$^a$ hereinbefore referred to for guiding, together with the guideway 173, Figs. 22 and 33, the printed and cut-off tickets in their movement from the printing press to the anvils. This plate 79 is provided with a hardened steel stud 82 projecting from the rear side thereof in position to run in a double or return channel or groove 82$^a$ formed in the block 77, this stud 82 sliding in one of the channels 82$^a$ during the movement of the plate 79 in one direction and in the other channel during the movement of the plate 79 in the opposite direction. This plate 79 is moved to the right and left the full length of the channels 82ª by a lever 90 pivotally connected to the plate 79 by a stud 84, Figs. 22, 23 and 32. In the upper part of plate 79 are a pair of studs 83, Figs. 23, 32 and 33, which alternately engage with the free end of a spring 85 located between the studs, this spring having its lower bent end fast to the frame member 76. As the thread securing member 79 is shifted to the right as far as one of the channels 82ª will allow it, the left stud 83 imparts a downward movement to the channel-engaging stud 82 and thereby the member 79, so that this channel stud will return in the lower channel 82ª, and when the member 79 is shifted to the left by the lever 90 as far as the stud 82 in channel 82ª will allow it to go, the right stud 83 will engage the spring 85 and cause the channel stud 82 to be lifted up, and thereby the member 79, and return in the upper channel to its original position. Thus the eye 81 carried by this member 79, with the ends of the thread in it, travels around the tail end 308 of the ticket, Figs. 36 and 37, and so secures or locks the thread onto the dovetailed end of the ticket in the manner shown in Fig. 37. The operating lever 90 for reciprocating the member 79 has a long sleeve 90ª, Figs. 4, 22 and 32, which passes through the frame member 76, and on the end of this sleeve is an arm 93, Figs. 1, 4 and 22, to which a link 98 is pivotally connected. This link 98 in turn is pivotally connected at its opposite end to a lever 99, Fig. 1, pivotally connected at its lower end by a stud carried by the frame, Fig. 1. This lever 99 is operated by a cam 207, Fig. 1, fast on the cam-shaft 208, a stud-carrying roller 101 being secured to the lever 99 in position to engage this cam. Thus, as the cam-shaft rotates, cam 207 through the medium of the lever 99, link 98 and lever 90 reciprocate the member 79, while the spring 85 and the two pins 83 cause the member to be either raised or lowered, so that the channel stud 82 will pass in either the upper or lower channel 82ª of the block 77, between which block and the blade 78 the member 79 is guided.

*Thread end or back tension means*

To secure the loose ends of the threads properly around the tail end of the ticket, a back tension on the free ends of the threads is necessary, and for this purpose a tension means, shown in the form of a half-ball 88, Fig. 34, is secured to a flat spring 87, Figs. 32 and 34, and to this spring is riveted a stud 82ᵇ which slides in a slot 82ᶜ of a bracket 86, the upper end of which is secured to the sliding plate 79, so that this slot guides the spring and its half-ball-formed tension, while the spring 87 places a pressure on this half-ball so as to press it against the guide eye 81 of the plate 79. Just before the securing of the thread commences, this half-ball is slid over the outer end of the needle guide eye 81, thus placing a back tension on the loose ends of the thread as they are being secured around the tail end of the ticket. This half-ball-carrying flat spring 87 is shifted back and forth by means of a lever 91, Figs. 1, 4, 22, 23 and 32, connected with the spring 87 by stud 89. This lever 91 has its upper end secured to a shaft 92 passing through and turning in the bushing or sleeve 90ª hereinbefore referred to, to which bushing the lever 90 is secured for shifting the thread securing member back and forth, Figs. 22, 23 and 32. On the other end of this shaft 92 is a double arm 94, Figs. 1, 2 and 22, and this double arm gets its motion in one direction from a cam-plate 97, Figs. 2, 3, 4 and 22, mounted on the lever 120 which actuates the swinging jaw 125, and its motion in the opposite direction by an arm 96, Figs. 3, 4 and 22, secured to the looper shaft 111. This arm 96 and cam-plate 97 thus give a rocking motion to the double arm 94, which, through shaft 92 and lever 91, reciprocates the half-ball tension device.

From the foregoing it will be seen that when the needle passes through the fabric and the ticket and starts to return, a loop is carried around the nose of the ticket, and when the needle has passed from the ticket and goods, the necessary thread is pulled out by the co-operating swinging jaws 125 and 127, this thread cut off and the free ends thereof then secured or locked around the tail end of the ticket and held in the inclined slots 306 and 307 thereof.

*The driving and clutch mechanism and starting mechanism*

As hereinbefore stated, a single cam-shaft 208 carrying the several cams hereinbefore referred to operates the several mechanisms hereinbefore described. One end of this cam-shaft enters a housing 2—3 which contains the speed-reduction gearing from the motor and the starting and stopping mechanism. When the goods is placed on the shiftable anvil 147, the hand of the operator is in position to shift the lever 130, Fig. 1, which lever is pivotally secured by a stud 31 to frame 1. At the opposite end this lever is connected to a link 29 by a pivot 32, and this link in turn is pivotally connected with a lever 27, Figs. 1, 14 and 15. This lever 27 is fast to a rock-shaft 26, Figs. 1, 2, 14 and 15, which has its bearings in housing 3. To this shaft 26 a trip-arm 24 is pinned, a spring 25 normally holding the upper end of this trip-arm against a set-screw 24ª. Turning free on cam-shaft 208 is a brass flange 16 and screwed to it is a fiber gear 15. This gear is driven by a pinion 10ª, Fig. 14, formed on the main or power shaft 10, which is connected by suitable couplings 13 and 14 with a motor 350. Fast to the fiber gear 15, which is loose on the cam-shaft 208, is an interiorly-notched flange 17, Fig. 14, and located in position relatively thereto is a slide comprising a pair of members 18 and 19 riveted together. These members have an elongated slot through which the cam-shaft 208 passes, whereby, while they are shiftable on the shaft, they rotate with it. The slide member 18 has a tooth that fits into the notches of the interiorly-notched flange 17 carried by the fiber gear 15, whereby, as this gear 15 is driven by the pinion 10ª of the motor shaft, the cam-shaft will be rotated. The other slide member 19 has a round nose that engages a projection of the trip-arm 24. A flat spring 23 forces the nose of the slide member 19 against the trip-arm 24 or the tooth of slide member 18 into the notches of the interiorly-notched gear member 17, as the case may be. Normally, the trip-arm 24 holds the slide member 19 down and this in turn holds the tooth of slide member 18 out of engagement with the notched flange 17 of the loose gear 15. When, however, starting lever 130 is shifted by the operator, the trip-arm 24 is swung away from the slide member 19, so that spring 23 will shift both slide members upward and allow the tooth of slide member 18 to engage with the rotating interiorly-notched flange 17 carried by the gear 15 and thus rotate the cam-shaft. When, however, the cam-shaft and the slide members 18 and 19 make one revolution, the nose of slide member 19, engages the trip-arm 24, which has been returned to its normal position by its spring 25, which thus pushes down the slide and so carries the tooth of the slide member 18 out of engagement with the interiorly-notched flange of the gear 15, thus stopping the rotation of the cam-shaft 208.

In practice, a plate 174, Fig. 1, protects and separates the goods from all moving parts of the machine.

From the foregoing it will thus be seen that a strip of suitable ticket-forming material is fed step by step into position to have a ticket severed from the end thereof and printed, whereupon the severed and printed ticket is partly lifted and fed into position to be attached to the fabric or goods, which is properly positioned for this purpose by the flexible anvil, and that thereupon the ticket is stitched to the goods by a single stitch, the loop of this stitch being carried by the reciprocating and rotating looper around the nose of the ticket, while the opposite ends of the threads are severed and the loose or free ends thereof secured and locked to the tail of the ticket by a reciprocating securing means, so that the ticket is stitched and secured to the goods by a single stitch requiring but two punctures of the needle in the goods and the ticket.

In practice, the price tags or tickets can be provided with needle holes for the reception of the needle thereby facilitating the operation of the needle especially when the tags are made of tough material or especially treated material and it will be also understood that certain of the instrumentalities herein shown and described may be more or less varied, for instance, a different form of looper mechanism may be used and that any means which will operate upon the loop or ticket to insure the reception of the loop thereby is within the meaning of the term "looper mechanism" as herein used.

It is to be understood that by describing in detail herein any particular form, structure or arrangement, it is not intended to limit the invention beyond the terms of the several claims or the requirements of the prior art.

Having thus explained the nature of my said invention and described a way of constructing and using the same, although without attempting to set forth all of the forms in which it may be made, or all of the modes of its use, I claim:

1. In a machine of the class described, the combination of means for stitching a price ticket to the goods, means for looping a loop of the thread to one part of the ticket, means for then severing the thread, and means for then securing the severed ends of the threads to another part of the ticket so that the ticket can be readily removed without severing or ripping the thread or tearing or ripping the ticket from the goods.

2. In a machine of the class described, the combination of means for stitching a price ticket to the goods by a single stitch requiring a pair only of punctures, means for severing the thread to form loose ends, and means for then securing the loose ends of the stitch thread to the ticket so that the ticket can be readily removed without severing or ripping the thread or tearing or ripping the ticket from the goods.

3. In a machine of the class described, the combination of means for stitching a price ticket to the goods by a single stitch requiring only a pair of punctures, means for looping a loop of the stitch thread around one part of the ticket, means for severing the thread to form loose ends, and means for then securing the loose ends of the stitch threads around another part of the ticket so that the ticket can be readily removed without severing or ripping the thread or tearing or ripping the ticket from the goods.

4. In a machine for attaching price tickets comprising stitching mechanism, looper mechanism, severing mechanism, securing mechanism, and means for operating them whereby the ticket is stitched to the goods, a loop of the stitch then secured to one part of the ticket, the thread then severed, and the severed ends of the stitch threads then secured to another part of the ticket.

5. In a machine for attaching price tickets having a nose and a slotted tail comprising mechanism effective to stitch the ticket to the goods by a single stitch requiring only a pair of punctures, means to loop the stitch around the nose of the ticket, means for severing the thread to form free ends, and means to secure the free ends of the stitch thread to the tail of the ticket.

6. In a machine of the class described, means for feeding a strip of ticket forming material, means for printing the ticket, and means for severing a ticket from the strip, the combination of means for feeding the severed ticket into position to be attached to the goods, means for positioning the goods, means for stitching the ticket to the goods, means for looping a loop of the stitch thread around a nose of the ticket, means for severing the stitched thread, and means for securing the severed ends of the stitch thread around a tail of the ticket.

7. In a machine of the class described, the combination of means for supplying a price ticket to the goods, means for stitching the ticket to the goods, means for looping a loop of the thread around a nose of the tag, means for severing the thread, and means for securing the severed ends of the thread to a tail of the ticket.

8. In a machine of the class described having means for feeding a strip of ticket forming material, means for printing the ticket, and means for severing a ticket from the strip, the combination of means for raising the rear edge of the severed ticket, means for engaging such raised rear edge and feeding the severed ticket into position to be attached to the goods, means for positioning the goods, means for stitching the ticket to the goods, means for looping a loop of the stitch thread around a nose of the ticket, means for severing the stitched thread, and means for securing the severed ends of the stitch thread around a tail of the ticket.

9. In a machine of the class described having means for feeding a strip of ticket forming material, means for printing the ticket, and means for severing a ticket from the strip, the combination of means for raising the rear edge of the severed ticket, means for engaging such raised rear edge and feeding the severed ticket into position to be attached to the goods, means for positioning the goods, means for stitching the ticket to the goods, means for looping a loop of the stitch thread around a nose of the ticket, means for severing the stitch thread, means for securing the severed ends of the stitch thread around a tail of the ticket, and means for tensioning the needle thread and releasing the same at a predetermined time.

10. In a machine of the class described, having means for feeding a strip of ticket forming material, means for printing the ticket, and means for severing a ticket from the strip, the combination of means for raising the rear edge of the severed ticket, means for engaging such raised rear edge and feeding the severed ticket into position to be attached to the goods, means for positioning the goods, means for stitching the ticket to the goods, means for looping a loop of the stitch thread around a nose of the ticket, means for severing the stitched thread, means for securing the severed ends of the stitch thread around a tail of the ticket, and means for tensioning the severed ends of the thread.

11. In a machine of the class described, having means for feeding a strip of ticket forming material, means for printing the ticket, and means for severing a ticket from the strip, the combination of means for feeding the severed ticket into position to be attached to the goods, means for positioning the goods, means for stitching the ticket to the goods, means for looping a loop of the stitch thread around a nose of the ticket, means for pulling out the thread, means for severing the stitched thread, and means for securing the severed ends of the stitch thread around a tail of the ticket.

12. In a price ticket machine comprising a ticket strip supporting means carrying a gang of tickets, each having a nose and a slotted tail, ticket strip guiding means, means for feeding the ticket strip step by step and comprising a pair of cooperating feed members and means for sliding one of said members relatively to the strip guiding means, swinging means for preventing retrograde movement of the strip, printing means for printing the ticket and operative to control the position of said swinging means, severing means for severing the printed ticket from the strip and also operated by said printing means, inking means for the printing means and comprising automatically reversible ribbon means, means for raising the rear edge of the severed ticket, ticket feeding means for feeding the severed ticket into position to be attached to the goods, anvil means for positioning the goods and the ticket and comprising a fixed anvil and a cooperating flexibly supported, shiftable anvil, said anvils constructed to curve the goods and the ticket, stitching means including a needle for stitching the ticket to the goods with a pair only of punctures, tensioning means for the needle thread and including means for releasing the tension at a predetermined time, looper means for carrying a loop of the needle thread around the nose of the ticket and comprising a shiftable looper, thread pull-out means comprising a pair of swinging jaws embodying thread severing means for severing the ends of the thread after the formation of the stitch, means for shifting one of said jaws laterally out of the path of the needle, means for tensioning the severed ends of the thread, means for securing the severed ends of the thread around the tail of the ticket, driving means including a shaft and cams carried thereby for actuating in sequence the several means and a motor therefor, and starting means under the control of the operator for making and automatically breaking connection between said driving means and cam shaft, whereby during each revolution of the cam shaft, a ticket strip will be fed step by step and a ticket thereof printed, severed, stitched and secured to the goods.

13. In a price ticket machine having means for supplying and guiding a strip of tickets having a locating slot between each pair of tickets, means for feeding said strip step by step, the combination of means successively co-operating with said locating slots for preventing retrograde movement of the strip, means for severing a ticket from the strip, means for feeding the severed ticket into position and means for stitching the ticket to the goods and then securing the loose thread ends to the ticket.

14. In a price ticket machine having means for supplying and guiding a strip of tickets having a locating slot between each pair of tickets, the combination of means for feeding said strip step by step and comprising a pair of cooperating feed members, one slidingly supported by said guiding means, means for sliding said member, means successively co-operating with said slots for preventing retrograde movement of the ticket strip, means for shifting said last means, means for severing a ticket from the strip, means for feeding the severed ticket into position and means for stitching the ticket to the goods and then securing the locked end of the thread to the ticket.

15. In a price ticket machine having means for supplying and guiding a strip of tickets, means for feeding said strip step by step, the combination of means for preventing retrograde movement of the strip, printing means for printing a ticket, and means operated thereby for shifting the preventing means, means for severing the ticket from the strip, means for feeding the severed ticket into position and means for attaching the ticket to the goods.

16. In a price ticket machine having means for supplying and guiding a strip of tickets having a locating slot between each pair of tickets, the combination of means for feeding said strip step by step and comprising a pair of cooperating feed members, one slidingly supported relatively to said guiding means, means for reciprocating said sliding member, swinging means successively co-operating with the locating slots for preventing retrograde movement of the strip, printing means for printing the ticket and carrying means co-operating with said swinging means for swinging the same, means for severing the ticket from the strip, means for feeding the severed ticket into position and means for attaching the ticket to the goods.

17. In a price ticket machine having means for supplying and guiding a strip of tickets having a locating slot between each pair of tickets, the combination of means for feeding said strip step by step and comprising a pair of co-operating feed members, one slidingly supported relatively to said guiding means, means for reciprocating said sliding member, swinging means successively co-operating with the locating slots for preventing retrograde movement of the strip, printing means for printing the ticket and carrying means co-operating with said swinging means for swinging the same, means for severing the tickets at the locating slots, means for feeding the severed tickets into position, and means for attaching the ticket to the goods.

18. In a price ticket machine having means for supplying and guiding a strip of tickets having a locating slot between each pair of tickets, the combination of means for feeding said strip step by step and comprising a pair of co-operating feed members, one slidingly supported relatively to said guiding means, means for reciprocating said sliding member, swinging means successively co-operating with the locating slots for preventing retrograde movement of the strip, printing means for printing the ticket and carrying means co-operating with said swinging means for swinging the same, means for severing the tickets at the locating slots and operated by said printing means, means for feeding the severed tickets into position and means for attaching the ticket to the goods.

19. In a price ticket machine having means for supplying and guiding a strip of tickets having a locating slot between each pair of tickets, the combination of means for feeding said strip step by step and comprising a pair of co-operating feed members, one slidingly supported relatively to said guiding means, means for reciprocating said sliding member, swinging means successively co-operating with the locating slots for preventing retrograde movement of the strip, printing means for printing the ticket and carrying means co-operating with said swinging means for swinging the same, means for severing the tickets at the locating slots and operated by said printing means, means for raising the rear edge of the ticket, means for engaging such rear edge for feeding the severed ticket into position to be attached to the goods, and means for attaching the ticket to the goods.

20. In a price ticket machine having means for supplying and guiding a strip of tickets, means for feeding said strip step by step, the combination of means for severing the ticket from the strip and comprising a reciprocating, pivotally-supported knife and a pair of spaced fixed knives between which said reciprocating knife moves, means for printing the ticket, means operated thereby for reciprocating the reciprocating knife, means for raising the rear edge of the ticket, means for feeding the severed ticket into position to be attached to the goods, and means for attaching the ticket to the goods.

21. In a price ticket machine having means for supplying and guiding a strip of tickets, means for feeding said strip step by step, means for printing the ticket, and means for severing the ticket from the strip, the combination of means for inking the printing mechanism and comprising automatically-reversible ribbon mechanism, means for feeding the severed ticket into position and means for attaching the ticket to the goods.

22. In a price ticket machine having means for supplying and guiding a strip of tickets, means for feeding said strip step by step, means for printing the ticket, and means for severing the ticket from the strip, the combination of means for inking the printing mechanism and comprising cam-operated, automatically-operative reversible ribbon mechanism, means for guiding the ribbon, means operated by the printing mechanism for shifting one of said guiding means thereby to lift the ribbon from the ticket, means for feeding the severed ticket into position and means for attaching the ticket to the goods.

23. In a price ticket machine having means for supplying and guiding a strip of tickets, means for feeding said strip step by step, means for preventing retrograde movement of the ticket strip, and means for printing the ticket, means for severing the ticket, the combination of automatically-operative reversible ribbon mechanism for inking the printing means and including guiding means for the ribbon, means operated by the printing means for shifting said guiding means thereby to raise the ribbon from the ticket, means for feeding the severed ticket into position and means for stitching the ticket to the goods and securing the thread to the ticket.

24. In a price ticket machine having means for supplying and guiding a strip of tickets, means for feeding said strip step by step, means for preventing retrograde movement of the ticket strip, and means for printing the ticket, the combination of means for severing the ticket and comprising a reciprocating knife operated by the printing means, automatically-operative reversible ribbon mechanism for inking the printing means and including means for guiding the ribbon, means operated by the printing means for shifting said guiding means thereby to raise the ribbon from the ticket, means for feeding the severed ticket into position and means for attaching the ticket to the goods.

25. In a price ticket machine having means for supplying and guiding a strip of tickets having a locating slot between each pair of tickets, the combination of means for feeding said strip step by step and comprising a pair of cooperating feed members, one slidingly supported relatively to said guiding means, means for sliding said sliding feed member, shiftable means successively co-operating with the locating slots for preventing retrograde movement of the ticket strip, printing means for the ticket and having means for shifting said preventing means, severing means for the ticket and including a reciprocating knife operated by said printing means, automatically-operative reversible ribbon mechanism for inking the printing means, means for feeding the severed ticket into position and means for attaching the ticket to the goods.

26. In a price ticket machine having means for supplying and guiding a strip of tickets having a locating slot between each pair of tickets, the combination of means for feeding said strip step by step and comprising a pair of cooperating feed members, one slidingly supported relatively to said guiding means, means for sliding said sliding feed member, shiftable means successively co-operating with the locating slots for preventing retrograde movement of the ticket strip, printing means for the ticket and having means for shifting said preventing means, severing means for the ticket and including a reciprocating knife operated by said printing means, automatically-operative reversible ribbon mechanism for inking the printing means and including shiftable guiding means for the ribbon also shifted by the printing means thereby to raise the ribbon from the ticket, means for feeding the severed ticket into position and means for attaching the ticket to the goods.

27. In a price ticket machine having means for supplying and guiding a strip of tickets having a locating slot between each pair of tickets, the combination of means for feeding said strip step by step and comprising a pair of cooperating feed members, one slidingly supported relatively to said guiding means, means for sliding said sliding feed member, means successively co-operating with the locating slots for preventing retrograde movement of the ticket strip, printing means for the ticket and having means for shifting said preventing means, severing means for the ticket and including a reciprocating knife operated by said printing means, automatically-operative reversible ribbon mechanism for inking the printing means and including shiftable guiding means for the ribbon also shifted by the printing means thereby to raise the ribbon from the ticket, means for raising the rear edge of the ticket, means for engaging the rear edge to feed the ticket into position to be attached to the goods, and means for attaching the ticket to the goods.

28. In a price ticket machine having means for supplying and guiding a strip of tickets having a locating slot between each pair of tickets, the combination of means for feeding said strip step by step and comprising a pair of co-operating feed members, one slidingly supported relatively to said guiding means, means for sliding said sliding feed member, means successively co-operating with the locating slots for preventing retrograde movement of the ticket strip, printing means for the ticket and having means for shifting said preventing means, severing means for the ticket and including a reciprocating knife operated by said printing means, automatically-operative reversible ribbon mechanism for inking the printing means and including shiftable guiding means for the ribbon also shifted by the printing means thereby to raise the ribbon from the ticket, means for raising the rear edge of the ticket and comprising a spring-pressed cam-operated plunger, means for engaging the rear edge of the ticket and feed the same into position for attachment to the goods and comprising a horizontally-supported cam-operated feeding member, and means for attaching the ticket to the goods.

29. In a price ticket machine having means for supplying and guiding a strip of tickets, means for feeding said strip step by step, the combination of means for preventing backward movement of the strip, printing means co-operating with said preventing means thereby to shift the same at a predetermined time, ticket severing means embodying a reciprocating knife also operated by the printing means, automatically-operative reversible ribbon mechanism for inking the printing means and including shiftable guiding means for the ribbon also operated by the printing means for raising the ribbon from the printed ticket, means for raising the rear edge of the ticket after it is printed, means for engaging such raised rear edge and feeding the severed ticket into position to be attached to the goods, and means for attaching the ticket to the goods.

30. In a price ticket machine having means for supplying and guiding a strip of tickets, means for feeding said strip step by step, means for printing and severing a ticket from the strip, the combination of means for raising the rear edge of the ticket, means for engaging such raised rear edge and feeding the severed and printed ticket into position to be attached to the goods and comprising a horizontally-positioned cam-operated lever, and means for attaching the ticket to the goods.

31. In a price ticket machine having means for supplying and guiding a strip of tickets, means for feeding said strip step by step, means for printing a ticket, means for severing a ticket from the strip, the combination of means for clamping the ticket and the goods and comprising a fixed anvil and a shiftably-supported anvil having means for curving the ticket and the goods, one of said anvils having a needle slot for the passage of a needle, means for stitching the ticket to the goods, and means for securing the loose end of the stitch to one end of the ticket.

32. In a price ticket machine, the combination of means for feeding a ticket into position to be attached to the goods, means for clamping and curving the ticket and the goods for the reception of a needle, means for stitching the ticket to the goods, and means for securing the thread thereof to the ticket.

33. In a price ticket machine, the combination of means for feeding a ticket into position to be attached to the goods, means for clamping and curving the ticket and the goods for the reception of a needle and comprising a fixed anvil having a concaved end and a shiftable and flexibly-supported anvil having a convex slotted end, and means for stitching the ticket to the goods and securing the thread thereof to the ticket.

34. In a price ticket machine, the combination of means for positioning and clamping the ticket and the goods, stitching mechanism, looper mechanism for looping a loop of the thread around one part of the ticket, means for severing the thread to form free ends, and means for then securing the free end of the thread around another part of the ticket.

35. In a price ticket machine, the combination of means for positioning the ticket and the goods, means for stitching the ticket to the goods, looper mechanism embodying a reciprocating and rotating looper for looping a loop of the thread around a part of the ticket, cam-operated means for shifting the looper in one direction, a spring for shifting it in the opposite direction, said spring also operative to rotate the looper in one direction, and cam-operated means for rotating it in the opposite direction.

36. In a price ticket machine, the combination of means for positioning the ticket and the goods, stitching mechanism, looper mechanism for looping a loop of the thread around a part of the ticket, and mechanism for securing the thread to another part of the ticket and including a pair of swinging jaws for pulling out the thread.

37. In a price ticket machine, the combination of means for positioning the ticket and the goods, stitching mechanism, looper mechanism for looping a loop of the thread around a part of the ticket, mechanism for securing the thread to another part of the ticket and including a pair of swinging jaws for pulling out the thread, cam-operated means and spring means for operating said jaws.

38. In a price ticket machine, the combination of means for positioning the ticket and the goods, stitching mechanism, looper mechanism for looping a loop of the thread around a part of the ticket, mechanism for securing the thread to another part of the ticket and including a pair of swinging jaws for pulling out the thread, and means for shifting one of said jaws laterally out of the path of the needle.

39. In a price ticket machine, the combination of means for positioning the ticket and the goods, stitching mechanism, looper mechanism for looping a loop of the thread around a part of the ticket, mechanism for securing the thread to another part of the ticket and including a pair of swinging jaws for pulling out the thread, and thread severing means.

40. In a price ticket machine, the combination of means for positioning the ticket and the goods, stitching mechanism, looper mechanism for looping a loop of the thread around a part of the ticket, mechanism for securing the thread to another part of the ticket and including a pair of swinging jaws for pulling out the thread, and thread severing means carried by said jaws and comprising a laterally-shiftable knife.

41. In a price ticket machine, the combination of means for positioning the ticket and the goods, stitching mechanism, looper mechanism for looping a loop of the thread around a part of the ticket, mechanism for securing the thread to another part of the ticket and including a pair of swinging jaws for pulling out the thread, thread severing means, and means for placing the severed threads under tension.

42. In a price ticket machine, the combination of means for positioning the ticket and the goods, stitching mechanism, looper mechanism for looping a loop of the thread around a part of the ticket, mechanism for securing the thread to another part of the ticket and including a pair of swinging jaws for pulling out the thread, thread severing means, and means for placing the severed threads under tension and comprising a spring-pressed, laterally-shiftable tension device and means for shifting it.

43. In a price ticket machine, the combination of means for positioning the ticket and the goods, means for stitching the ticket to the goods, means for looping a loop of the thread to the ticket, and means for securing the thread to a part of the ticket and comprising a shiftable member reciprocating in transverse paths, and means for reciprocating it.

44. In a price ticket machine, the combination of means for positioning the ticket and the goods, means for stitching the ticket to the goods, means for looping a loop of the thread to the ticket, means for securing the thread to a part of the ticket and comprising a shiftable member reciprocating in transverse paths having a pin, a parallel channelled block for the reception of the pin, means for reciprocating the member lengthwise of the channel, and means for reciprocating it transversely of the channel.

45. In a price ticket machine, the combination of means for positioning the ticket and the goods, means for stitching the ticket to the goods, means for looping a loop of the thread to the ticket, means for securing the thread to a part of the ticket and comprising a shiftable member reciprocating in transverse paths having a pin, a parallell-channelled block for the reception of the pin, means for reciprocating the member lengthwise of the channel and means for reciprocating it transversely of the channel, and thread tension means co-operating with said securing means and comprising a shiftable tension device and means for reciprocating it.

46. In a price ticket machine, the combination of means for positioning the ticket and the goods, stitching mechanism for stitching the ticket to the goods, looper mechanism for looping a loop of the thread around a part of the ticket, thread pull-out means, thread severing means, and means for securing the thread around another part of the ticket.

47. In a price ticket machine, the combination of means for positioning the ticket and the goods, stitching mechanism for stitching the ticket to the goods, looper mechanism for looping a loop of the thread around a part of the ticket, thread pull-out means, thread severing means, and means for securing the thread around another part of the ticket, said thread pull-out means comprising a pair of swinging jaws and said securing means comprising a reciprocating member operative in transverse paths.

48. In a price ticket machine, the combination of means for positioning the ticket and the goods, stitching mechanism for stitching the ticket to the goods, looper mechanism for looping a loop of the thread around a part of the ticket, thread pull-out means, thread severing means, means for securing the thread around another part of the ticket, said thread pull-out means comprising a pair of swinging jaws and said securing means comprising a reciprocating member operative in transverse paths, and means for shifting one of said jaws laterally out of the path of the needle.

49. In a price ticket machine, the combination of means for positioning the ticket and the goods, stitching mechanism for stitching the ticket to the goods, looper mechanism for looping a loop of the thread around a part of the ticket, thread pull-out means, thread severing means, means for securing the thread around another part of the ticket, said thread pull-out means comprising a pair of swinging jaws and said thread securing means comprising a reciprocating member operative in transverse paths, means for shifting one of said jaws laterally out of the path of the needle, and reciprocating tension means for placing the severed threads under tension.

50. In a price ticket machine, the combination of means for positioning the ticket and the goods, means for stitching the ticket to the goods, looper mechanism for looping a loop of the needle thread around a part of the ticket, thread pull-out means comprising a pair of swinging jaws, means for moving said jaws toward and from each other and together, thread severing means carried by the jaws, means for shifting one of the jaws laterally out of the path of the needle, transversely-reciprocating thread securing means for securing a part of the thread to another part of the ticket, and reciprocating thread tensioning means co-operating with said securing means.

51. In a price ticket machine, the combination of means for positioning the ticket and the goods, means for stitching the ticket to the goods, looper mechanism for looping a loop of the needle thread around a part of the ticket and comprising a shiftable looper, thread pull-out means comprising a pair of swinging jaws, means for moving said jaws toward and from each other and together, thread severing means carried by the jaws, means for shifting one of the jaws laterally out of the path of the needle, transversely-reciprocating thread securing means for securing a part of the thread to another part of the ticket, and reciprocating thread tensioning means co-operating with said securing means.

52. In a price ticket machine, the combination of means for positioning the ticket and the goods and comprising clamping means for curving the ticket and the goods, including a shiftable and flexibly-supported anvil, means for stitching the ticket to the goods, looper mechanism for looping a loop of the needle thread around a part of the ticket, thread pull-out means comprising a pair of swinging jaws, means for moving said jaws toward and from each other and together, thread severing means carried by the jaws, means for shifting one of the jaws laterally out of the path of the needle, transversely-reciprocating thread securing means for securing a part of the thread to another part of the ticket, and reciprocating thread tensioning means co-operating with said securing means.

53. In a price ticket machine, the combination of means for stitching the ticket to the goods, looper mechanism including a shiftable looper for looping a thread loop around one part of the ticket and means for shifting the looper in a plurality of directions, thread pull-out means comprising a pair of swinging jaws and including cam-operated means for swinging one of said jaws, thread severing means carried by said jaws, thread securing means comprising a transversely-reciprocating member and cam-operated means for reciprocating it, and reciprocating thread tensioning means carried by said member for tensioning the severed threads.

54. In a price ticket machine, the combination of means for stitching a ticket to the goods, looper mechanism including a shiftable looper for looping a thread loop around one part of the ticket and means for shifting the looper in a plurality of directions, thread pull-out means comprising a pair of swinging jaws and including cam-operated means for swinging one of said jaws, thread severing means carried by said jaws, thread means comprising a transversely-reciprocating member and cam-operated means for reciprocating it, reciprocating thread tensioning means carried by said member for tensioning the severed threads, and cam-operated means for shifting one of said swinging jaws laterally out of the path of the needle.

55. In a price ticket machine, the combination of means for stitching the ticket to the goods, means for looping a loop of the thread to the ticket, means for securing the thread to another part of the ticket, thread pull-out and severing means including a pair of swinging jaws, means for swinging said jaws, and cam means for releasing the thread from the jaws at a predetermined time.

56. In a price ticket machine, the combination of means for stitching the ticket to the goods, means for looping a loop of the thread to the ticket, means for securing the thread to another part of the ticket, thread pull-out and severing means including a pair of swinging jaws, means for swinging said jaws, means for releasing the thread from the jaws at a predetermined time, and tension means for holding the released thread.

57. In a price ticket machine having means for feeding a ticket strip, means for printing and severing a ticket from the strip, and means for clamping the ticket and the goods, the combination of stitching mechanism for stitching the ticket to the goods, looper mechanism for looping the thread around one part of the ticket, thread pull-out means, thread severing means, means for securing a part of the thread around another part of the ticket, and means for operating the several means in sequence and comprising a cam-shaft and means for controlling the operation of said cam-shaft.

58. In a price ticket machine having means for feeding a ticket strip, means for printing and severing a ticket from the strip, and means for clamping the ticket and the goods, the combination of stitching mechanism for stitching the ticket to the goods, looper mechanism for looping the thread around one part of the ticket, thread pull-out means, thread severing means, means for securing a part of the thread around another part of the ticket, and means for operating the several means in sequence and comprising a cam-shaft and means for controlling the operation of said cam-shaft, and comprising a starting lever and clutch mechanism controlled thereby.

59. In a price ticket machine having means for feeding a ticket strip, means for printing and severing a ticket from the strip, means for clamping the ticket and the goods, the combination of stitching mechanism for stitching the ticket to the goods, looper mechanism for looping the thread around one part of the ticket, thread pull-out means, thread severing means, means for securing a part of the thread around another part of the ticket, and means for operating the several means in sequence and comprising a cam-shaft and means for controlling the operation of said cam-shaft, and comprising a starting lever and clutch mechanism controlled thereby, said starting lever being located in position adjacent to said work-clamping means.

60. In a price ticket machine, the combination of cam-operated means for feeding a ticket strip, cam-operated means for preventing backward movement of the ticket strip, cam-operated printing means for printing a ticket, severing means operated by the printing means for severing the ticket from the strip, cam-operated ribbon means for inking the printing means, cam-operated means for raising the rear edge of the printed ticket, cam-operated means for feeding the printed ticket into position to be attached to the goods, cam-operated means for clamping the ticket and the goods, cam-operated needle mechanism for stitching the ticket to the goods, a looper for looping the thread around a part of the ticket, a combined spring and cam-operated means for pulling out the thread, cam-operated thread severing means, cam-operated means for shifting a part of said thread pull-out means out of the path of the needle, cam-operated thread securing means for securing the thread around another part of the ticket, cam-operated thread tensioning means co-operating with said securing means, and means for rotating some of said cam operated means.

61. In a price ticket machine, the combination of cam-operated means for feeding a ticket strip, cam-operated means for preventing backward movement of the ticket strip, cam-operated printing means for printing a ticket, severing means operated by the printing means for severing the ticket from the strip, cam-operated ribbon means for inking the printing means, cam-operated means for raising the rear edge of the printed ticket, cam-operated means for feeding the printed ticket into position to be attached to the goods, cam-operated means for clamping the ticket and the goods, cam-operated needle mechanism for stitching the ticket to the goods, a looper for looping the thread around a part of the ticket, a combined spring and cam-operated means for pulling out the thread, cam-operated thread severing means, cam-operated means for shifting a part of said thread pull-out means out of the path of the needle, cam-operated thread securing means for securing the thread around another part of the ticket, cam-operated thread tensioning means co-operating with said securing means, means for rotating some of said cam operated means and comprising a cam-shaft, a motor-driven shaft and clutch mechanism for connecting said shafts, and starting means for controlling said clutch mechanism, whereby on the operation thereof said cam-shaft will during one complete rotation thereof operate the several mechanisms in the proper sequence.

62. In a price ticket machine, the combination of cam-operated means for feeding a ticket strip, cam-operated means for preventing backward movement of the ticket strip, cam-operated printing means for printing a ticket, severing means operated by the printing means for severing the ticket from the strip, cam-operated ribbon means for inking the printing means, cam-operated means for raising the rear edge of the printed ticket, cam-operated means for feeding the printed ticket into position to be attached to the goods, cam-operated means for clamping the ticket and the goods, cam-operated needle mechanism for stitching the ticket to the goods, a looper for looping the thread around a part of the ticket, a combined spring and cam-operated means for pulling out the thread, cam-operated thread severing means, cam-operated means for shifting a part of said thread pull-out means out of the path of the needle, cam-operated thread securing means for securing the thread around another part of the ticket, cam-operated thread tensioning means co-operating with said securing means, means for rotating some of said cam operated means and comprising a cam-shaft, a motor-driven shaft and clutch mechanism for connecting said shafts, and starting means for controlling said clutch mechanism, whereby on the operation thereof said cam-shaft will during one complete rotation thereof, operate the several mechanisms in the proper sequence, said starting mechanism including a starting lever located in position adjacent to the ticket and goods clamping means, whereby it may be operated simultaneously with the placing of the work in position relative to said clamping means.

63. In a price ticket machine, the combination of means for clamping and imparting a curved form to the ticket and the goods, needle mechanism including a horizontally-located needle for stitching the ticket to the goods, looper mechanism including a shiftable looper and means for operating it for carrying a loop of the needle thread around a part of the ticket, and a horizontally and vertically-reciprocating means for securing a part of the thread around another part of the ticket.

64. In a price ticket machine, the combination of means for clamping and imparting a curved form to the ticket and the goods, needle mechanism including a horizontally-located needle for stitching the ticket to the goods, looper mechanism including a shiftable looper and means for operating it for carrying a loop of the needle thread around a part of the ticket, a horizontally and vertically-reciprocating means for securing a part of the thread around another part of the ticket, and means operative intermediate the looping and securing of the thread for pulling out the thread.

65. In a price ticket machine, the combination of means for clamping and imparting a curved form to the ticket and the goods needle mechanism including a horizontally-located needle for stitching the ticket to the goods, looper mechanism including a shiftable looper and means for operating it for carrying a loop of the needle thread around a part of the ticket, a horizontally and vertically-reciprocating means for securing a part of the thread around another part of the ticket, swinging means operative intermediate the looping and securing of the thread for pulling out the thread, and thread severing means carried by said swinging means for severing the thread prior to or to the securing thereof.

66. In a price ticket machine, the combination of means for clamping and imparting a curved form to the ticket and the goods, needle mechanism including a horizontally-located needle for stitching the ticket to the goods, looper mechanism including a shiftable looper and means for operating it for carrying a loop of the needle thread around a part of the ticket, a horizontally and vertically-reciprocating means for securing a part of the thread around another part of the ticket, swinging means operative intermediate the looping and securing of the thread for pulling out the thread, thread severing means carried by said swinging means for severing the thread prior to the securing thereof, and reciprocating thread tension means for tensioning the free ends of the thread.

67. In a price ticket machine, the combination of means for clamping and imparting a curved form to the ticket and the goods, needle mechanism including a horizontally-located needle for stitching the ticket to the goods, looper mechanism including a shiftable looper and means for operating it for carrying a loop of the needle thread around a part of the ticket, a horizontally and vertically-reciprocating means for securing a part of the thread around another part of the ticket, swinging means operative intermediate the looping and securing of the thread for pulling out the thread, thread severing means carried by said swinging means for severing the thread prior to the securing thereof, reciprocating thread tension means for tensioning the free ends of the thread, and tensioning means for tensioning the thread after the same is pulled out and severed.

68. A price ticket machine having means for feeding a ticket strip, means for printing and severing a ticket therefrom, the combination of means for feeding the severed ticket into position to be attached to the goods, means for carrying the goods into position adjacent to the ticket and for clamping the ticket and the goods, means for stitching the ticket to the goods, means for looping a loop of the needle thread around one part of the ticket, means for severing the thread, means for securing the severed thread around another part of the ticket, and means for operating said means.

69. A price ticket machine having means for feeding a ticket strip, means for printing and severing a ticket therefrom, the combination of means for feeding the severed ticket into position to be attached to the goods, means for clamping the ticket and the goods, means for stitching the ticket to the goods, means for looping a loop of the needle thread around one part of the ticket, means for severing the thread, means for securing the severed thread around another part of the ticket, means for operating said means, and means for controlling the operation of said operating means and including a starting device located adjacent to the work-clamping means.

70. In a price ticket machine having means for feeding a strip of tickets, and means for printing and severing a ticket therefrom, the combination of means for stitching the ticket to the goods, means for looping a thread loop around one part of the ticket, means for severing the thread, means for securing the severed thread around another part of the ticket, tension means for the needle thread, tension means for the severed thread, and tension means co-operating with the securing means for holding the free ends of the thread during the tying thereof to the ticket.

71. In a price ticket machine having means for feeding a strip of tickets, and means for printing and severing a ticket therefrom, the combination of means for stitching the ticket to the goods, means for looping a thread loop around one part of the ticket, means for severing the thread, means for securing the severed thread around another part of the ticket, tension means for the needle thread, tension means for the severed thread, tension means co-operating with the securing means for holding the free ends of the thread during the securing thereof to the ticket, and means for automatically releasing the needle tension means during the rearward movement of the needle.

72. In a price ticket machine having means for feeding a strip of tickets, and means for printing and severing a ticket therefrom, the combination of means for stitching the ticket to the goods, means for looping a thread loop around one part of the ticket, means for severing the thread, means for securing the severed thread around another part of the ticket, tension means for the needle thread, tension means for the severed thread, tension means co-operating with the securing means for holding the free ends of the thread during the securing thereof to the ticket, means for automatically releasing the needle tension means during the rearward movement of the needle, and means for reciprocating the tension means co-operating with the securing means.

73. In a price ticket machine having means for feeding a ticket strip in one direction, and means for printing and severing a ticket from the strip, the combination of means for feeding the ticket in the same direction into position to be attached to the goods, means for clamping the ticket and the goods and simultaneously raising the ticket and the goods into a curved position transversely of the direction of movement of the strip, and needle mechanism including a needle operative transversely to the direction of feed of the ticket for stitching the ticket to the goods.

74. In a price ticket machine having means for feeding a ticket strip in one direction, and means for printing and severing a ticket from the strip, the combination of means for feeding the ticket in the same direction into position to be attached to the goods, means for clamping the ticket and the goods and simultaneously raising the ticket and the goods into a curved position transversely of the direction of movement of the strip, and needle mechanism including a needle operative transversely to the direction of feed of the ticket for stitching the ticket to the goods, looper mechanism operative to carry a loop of the needle thread around one part of the ticket, and thread securing means operative in the direction of feed of the ticket for securing the thread around another part of the ticket.

75. In price ticket machine, the combination of needle mechanism, looper mechanism, thread pull-out mechanism, thread severing mechanism, thread securing mechanism, and means for operating said mechanisms in sequence first to stitch the ticket to the goods, then carry a loop of the needle thread around one part of the ticket, then pull out the needle thread, then sever and release the same, and then carry the loose ends of the severed thread around another part of the ticket.

76. In a price ticket machine, the combination of needle mechanism, looper mechanism, thread pull-out mechanism, thread severing mechanism, tension means for holding the severed thread, thread securing mechanism, and means for operating said mechanisms in sequence first to stitch the ticket to the goods, then carry a loop of the needle thread around one part of the ticket, then pull out the needle thread, then sever and release the same and hold the released end thereof, and then carry the loose ends of the severed thread around another part of the ticket.

77. In a price ticket machine, the combination of needle mechanism, looper mechanism, thread pull-out mechanism, thread severing mechanism, tension means for holding the severed thread, thread securing mechanism, tension means co-operating with the securing mechanism for tensioning the free ends of the thread, and means for operating said mechanisms in sequence first to stitch the ticket to the goods, then carry a loop of the needle thread around one part of the ticket, then pull out the needle thread, then sever and release the same and hold the released end and also tension the free ends of the thread, and then carry the loose ends of the severed thread around another part of the ticket.

78. In a machine of the class described, the combination of means for stitching a ticket to the goods, means for severing the thread to form free ends, and means for then securing the free end of the stitch thread to the ticket so that it can be released to remove the ticket without the necessity of severing or ripping the thread or tearing or ripping the ticket from the goods.

79. In a machine of the class described, the combination of means for stitching a ticket to the goods with a single stitch, means for severing the thread to form free ends, and means for then securing the free end of the stitch thread to the ticket so that it can be released to remove the ticket without the necessity of severing or ripping the thread or tearing or ripping the ticket from the goods.

80. In a machine of the class described, the combination of means for stitching a ticket to the goods with a single stitch, means for severing the stitch thread, and means for then securing the severed end of the stitch thread to the ticket so that it can be released to remove the ticket without the necessity of severing or ripping the thread or tearing or ripping the ticket from the goods.

81. In a machine of the class described, the combination of means for stitching a ticket to the goods with a single stitch requiring but a pair of spaced perforations in the ticket for the passage of the needle, means for severing the thread to form free ends, and means for then securing the free ends of the stitch thread in a readily accessible part of the ticket so that the ticket can be readily removed without severing or ripping the thread or tearing or ripping the ticket from the goods.

82. In a machine of the class described, the combination of means for stitching a ticket to the goods with a single stitch requiring but a pair of spaced perforations in the ticket for the passage of the needle, means for severing the thread to form free ends, and means for securing the ends of the thread with the extreme ends thereof on top of the ticket so that the ticket can be readily removed without severing or ripping the thread or tearing or ripping the ticket from the goods.

83. In a machine of the class described, the combination of means for stitching a ticket to the goods with a single stitch requiring but a pair of spaced perforations in the ticket for the passage of the needle at opposite ends of the ticket, means for severing the thread to form free ends, and means for securing the ends of the thread with the extreme ends thereof on top of the ticket adjacent to one of said perforations so that the ticket can be readily removed without severing or ripping the thread or tearing or ripping the ticket from the goods.

84. In a machine of the class described, the combination of means for stitching a ticket to the goods with a single stitch, with one loop of the thread extending lengthwise of the ticket, means for severing the thread to form free ends, and means for then effectively securing the free end of the thread against premature removal, while permitting the release of the ticket without the necessity of severing or ripping the thread or tearing or ripping the ticket from the goods.

85. In a machine of the class described, the combination of means for stitching a ticket to the goods with a single stitch, with one loop of the thread extending lengthwise of the ticket and one loop of the thread extending crosswise of the ticket, means for severing the thread to form free ends, and means for then effectively securing the free end of the thread against premature removal, while permitting the release of the ticket without the necessity of severing or ripping the thread or tearing or ripping the ticket from the goods.

Signed at New York, N. Y., this 10th day of April, 1928.

ROBERT H. PLASS.